(12) United States Patent
Parekh et al.

(10) Patent No.: US 11,509,681 B2
(45) Date of Patent: *Nov. 22, 2022

(54) RELATIVE RISK RANKING OF CLOUD ASSETS USED IN MULTI-CLOUD WORKLOADS

(71) Applicant: Virtustream IP Holding Company LLC, Bethesda, MD (US)

(72) Inventors: Pritesh Parekh, Fremont, CA (US); Nicholas Kathmann, Bolton, MA (US); Qintao Zhao, Great Falls, VA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/198,713

(22) Filed: Mar. 11, 2021

(65) Prior Publication Data

US 2022/0294817 A1   Sep. 15, 2022

(51) Int. Cl.
*H04L 9/40* (2022.01)
*G06F 9/54* (2006.01)
(Continued)

(52) U.S. Cl.
CPC .......... *H04L 63/1433* (2013.01); *G06F 9/547* (2013.01); *H04L 43/12* (2013.01); *H04L 63/1425* (2013.01); *H04L 67/10* (2013.01)

(58) Field of Classification Search
CPC . H04L 43/12; H04L 63/1408; H04L 63/1425; H04L 63/1433; H04L 67/10; G06F 9/547
See application file for complete search history.

(56) References Cited

U.S. PATENT DOCUMENTS

2014/0337086 A1*  11/2014  Asenjo ............... H04L 41/0896
                                                    705/7.28
2018/0205755 A1*   7/2018  Kavi .................. H04L 63/1433
(Continued)

OTHER PUBLICATIONS

Algosec, "Devopsifying Network Security," An AlgoSec Technical Whitepaper, May 2018, 12 pages.

(Continued)

*Primary Examiner* — Jeong S Park
(74) *Attorney, Agent, or Firm* — Ryan, Mason & Lewis, LLP

(57) ABSTRACT

An apparatus comprises a processing device configured to receive, at a user interface of a trust platform configured to manage cloud assets operating in clouds of two or more cloud service providers, a request to view multi-cloud relative risk information for at least a subset of the cloud assets on which workloads of a given entity run. The processing device is also configured to obtain, utilizing application programming interfaces of the trust platform, first and second sets of cloud asset risk data generated by first and second pluralities of monitoring tools operating in tenant and management environments of the clouds of the two or more cloud service providers. The processing device is further configured to generate and provide, at the user interface of the trust platform, a unified view of the multi-cloud relative risk information utilizing the first and second sets of cloud asset risk data.

20 Claims, 33 Drawing Sheets

(51) Int. Cl.
*H04L 43/12* (2022.01)
*H04L 67/10* (2022.01)

(56) References Cited

U.S. PATENT DOCUMENTS

| | | | | |
|---|---|---|---|---|
| 2020/0043008 | A1* | 2/2020 | Hrabik | G06Q 20/405 |
| 2020/0210293 | A1* | 7/2020 | Singh | G06F 11/302 |
| 2021/0109789 | A1* | 4/2021 | McWeeney | G06F 9/5022 |
| 2022/0043008 | A1* | 2/2022 | Yui | G01N 33/553 |
| 2022/0210141 | A1* | 6/2022 | Parekh | H04L 63/08 |
| 2022/0210195 | A1* | 6/2022 | Parekh | H04L 63/1425 |
| 2022/0210196 | A1* | 6/2022 | Parekh | H04L 41/28 |

OTHER PUBLICATIONS

Red Hat Ansible, "The AWX Project," https://www.ansible.com/products/awx-project/faq, Accessed Dec. 8, 2020, 5 pages.
Microsoft, "What is Azure Service Bus?" https://docs.microsoft.com/en-us/azure/service-bus-messaging/service-bus-messaging-overview, Nov. 20, 2020, 7 pages.
ServiceNow, Inc. "Azure and ServiceNow: Integrate your IT Operations to the Microsoft Cloud," 2019, 4 pages.
ServiceNow, Inc. "Create a Blueprint for Ansible Tower Integration," Accessed Dec. 8, 2020, 4 pages.
Cyberark, "The Cyberark Privileged Access Security Solution," White Paper, 2019, 10 pages.
Virtustream, "xStream Datasheet," Dec. 6, 2012, 8 pages.
Trend Micro, "Deep Security Software," Datasheet, 2020, 6 pages.
Centrify, "Centrify Privileged Access Service," 2020, 4 pages.
Ping Identity, "Unleash the Power of Identity Security," https://www.pingidentity.com/en.html, Accessed Dec. 8, 2020, 7 pages.
Microsoft, "Welcome to Azure Cosmos DB," https://docs.microsoft.com/en-us/azure/cosmos-db/introduction, Oct. 23, 2020, 4 pages.
Fortinet, "Protect Against Known and Zero-day Threats," https://www.fortinet.com/use-cases/ips, Accessed Dec. 21, 2020, 6 pages.
ElasticSearch, "Logstash Introduction," https://www.elastic.co/guide/en/logstash/current/Introduction.html, Accessed Dec. 8, 2020, 4 pages.
Trend Micro, "Trend Micro Deep Security," Product Sheet, https://www.trendmicro.com/aws/server-defender/deep-security-product-sheet, Accessed Dec. 21, 2020, 16 pages.
Microsoft, "Quickstart: Get Started with Azure Sentinel," https://docs.microsoft.com/en-us/azure/sentinel/quickstart-get-visibility, Sep. 16, 2020, 6 pages.
Fortinet, "Proactive Threat Protection with FortiGate IPS," Solution Brief, 2020, 2 pages.
Splunk.com, "Heavy Forwarder," https://docs.splunk.com/Splexicon:Heavyforwarder, Accessed Dec. 8, 2020, 10 pages.
Dell Technologies, "Virtustream Enterprise Cloud," Data Sheet, 2018, 4 pages.
Microsoft, "Azure Key Vault Basic Concepts," https://docs.microsoft.com/en-us/azure/key-vault/general/basic-concepts, Jan. 18, 2019, 5 pages.
Microsoft, "What is Azure Sentinel?" https://docs.microsoft.com/en-us/azure/sentinel/overview, Sep. 16, 2020, 7 pages.
Fortinet, "Securing the Cloud," White Paper, 2016, 3 pages.
Dell Technologies "xStream Portal User Guide," Jan. 2018, 111 pages.
U.S. Appl. No. 17/138,189 filed in the name of Pritesh Parekh et al. on Dec. 30, 2020, and entitled "Policy Driven Management of Security and Compliance Controls for Multi-Cloud Workloads."
U.S. Appl. No. 17/138,216 filed in the name of Pritesh Parekh et al. on Dec. 30, 2020, and entitled "Access Management for Multi-Cloud Workloads."
U.S. Appl. No. 17/138,216 filed in the name of Pritesh Parekh et al. on Dec. 30, 2020, and entitled "Management of Security and Compliance Controls for Multi-Cloud Workloads."
U.S. Appl. No. 17/138,235 filed in the name of Pritesh Parekh et al. on Dec. 30, 2020, and entitled "Generating Unified Views of Security and Compliance for Multi-Cloud Workloads."

* cited by examiner

| ALERTS TABLE PANE 407 | | | | | | | | |
|---|---|---|---|---|---|---|---|---|
| DATE/TIME | SEVERITY | CSP | DESCRIPTION | SOURCE | DESTINATION | AFFECTED ASSET(S) | AFFECTED ASSET(S) IMPORTANCE | AFFECTED ASSET(S) RISK |
| 12/01/2020, 09:00AM | CRITICAL | CSP1 | IDENTIFY POSSIBLE RANSOMWARE | SOURCE ADDRESS 1 | DESTINATION ADDRESS 1 | ASSET LIST 1 | ASSET IMPORTANCE VALUE(S) 1 | ASSET RISK VALUE(S) 1 |
| 12/01/2020, 9:01AM | MEDIUM | CSP2 | BLOCK ADMINISTRATIVE SHARE | SOURCE ADDRESS 2 | DESTINATION ADDRESS 2 | ASSET LIST 2 | ASSET IMPORTANCE VALUE(S) 2 | ASSET RISK VALUE(S) 2 |
| ⋮ | ⋮ | ⋮ | ⋮ | ⋮ | ⋮ | ⋮ | ⋮ | ⋮ |

FIG. 4D

TRUST PLATFORM GUI 112

| DASHBOARD SELECTION PANE | VULNERABILITY DASHBOARD 501 |
|---|---|
| ALERT DASHBOARD | |
| VULNERABILITY DASHBOARD | VULNERABILITY AGING REPORT PANE 503 |
| LOG ANALYTICS | |
| POLICY | |
| COMPLIANCE REPORTING | VULNERABILITIES TABLE PANE 507 |
| ASSET MANAGEMENT | |
| FIREWALL AUDITING | |
| USER MANAGEMENT | |
| CLOUD SERVICE PROVIDER MANAGEMENT | |

TOP VULNERABILITIES CHART PANE 505

TOP VULNERABLE ASSETS CHART

Vulnerability Aging Report:

| AGING REPORT | 0-15 DAYS | 16-30 DAYS | 31-90 DAYS | 91-120 DAYS | 121+ DAYS |
|---|---|---|---|---|---|
| CRITICAL | 77 | 17 | 0 | 0 | 0 |
| HIGH | 424 | 109 | 0 | 0 | 0 |
| MODERATE | 468 | 88 | 0 | 0 | 0 |
| LOW | 54 | 7 | 0 | 0 | 0 |

Vulnerabilities Table:

| | CLOUD ASSET ATTRIBUTE 1 | CLOUD ASSET ATTRIBUTE 2 | CLOUD ASSET ATTRIBUTE 3 | CLOUD ASSET ATTRIBUTE 4 |
|---|---|---|---|---|
| CLOUD ASSET 1 | ATTRIBUTE VALUE 1,1 | ATTRIBUTE VALUE 1,2 | ATTRIBUTE VALUE 1,3 | ATTRIBUTE VALUE 1,4 |
| CLOUD ASSET 2 | ATTRIBUTE VALUE 2,1 | ATTRIBUTE VALUE 2,2 | ATTRIBUTE VALUE 2,3 | ATTRIBUTE VALUE 2,4 |
| CLOUD ASSET 3 | ATTRIBUTE VALUE 3,1 | ATTRIBUTE VALUE 3,2 | ATTRIBUTE VALUE 3,3 | ATTRIBUTE VALUE 3,4 |
| ⋮ | ⋮ | ⋮ | ⋮ | ⋮ |

VULNERABILITIES

FIG. 5A

VULNERABILITIES TABLE PANE 507

| | CLOUD ASSET ATTRIBUTE 1 | CLOUD ASSET ATTRIBUTE 2 | CLOUD ASSET ATTRIBUTE 3 | CLOUD ASSET ATTRIBUTE 4 | ... | ASSET IMPORTANCE | ASSET RISK |
|---|---|---|---|---|---|---|---|
| CLOUD ASSET 1 | ATTRIBUTE VALUE 1,1 | ATTRIBUTE VALUE 1,2 | ATTRIBUTE VALUE 1,3 | ATTRIBUTE VALUE 1,4 | ... | ASSET IMPORTANCE VALUE 1 | ASSET RISK VALUE 1 |
| CLOUD ASSET 2 | ATTRIBUTE VALUE 2,1 | ATTRIBUTE VALUE 2,2 | ATTRIBUTE VALUE 2,3 | ATTRIBUTE VALUE 2,4 | ... | ASSET IMPORTANCE VALUE 2 | ASSET RISK VALUE 2 |
| CLOUD ASSET 3 | ATTRIBUTE VALUE 3,1 | ATTRIBUTE VALUE 3,2 | ATTRIBUTE VALUE 3,3 | ATTRIBUTE VALUE 3,4 | ... | ASSET IMPORTANCE VALUE 3 | ASSET RISK VALUE 3 |
| ... | ... | ... | ... | ... | | | |

VULNERABILITIES

FIG. 5C

| TRUST PLATFORM GUI 112 | | |
|---|---|---|
| DASHBOARD SELECTION PANE | LOG ANALYTICS DASHBOARD 601 | |
| ALERT DASHBOARD | LOG SEARCH PANE 603 | |
| VULNERABILITY DASHBOARD | SEARCH BAR | |
| LOG ANALYTICS | LOG SEARCH RESULTS TABLE PANE 605 | |
| POLICY | SECURITY LOGS | |
| COMPLIANCE REPORTING | | LOG ATTRIBUTE 1 | LOG ATTRIBUTE 2 | LOG ATTRIBUTE 3 | LOG ATTRIBUTE 4 |
| ASSET MANAGEMENT | CLOUD ASSET 1 | ATTRIBUTE VALUE | ATTRIBUTE VALUE | ATTRIBUTE VALUE | ATTRIBUTE VALUE |
| FIREWALL AUDITING | CLOUD ASSET 2 | ATTRIBUTE VALUE | ATTRIBUTE VALUE | ATTRIBUTE VALUE | ATTRIBUTE VALUE |
| USER MANAGEMENT | CLOUD ASSET 3 | ATTRIBUTE VALUE | ATTRIBUTE VALUE | ATTRIBUTE VALUE | ATTRIBUTE VALUE |
| CLOUD SERVICE PROVIDER MANAGEMENT | ⋮ | ⋮ | ⋮ | ⋮ | ⋮ |

FIG. 6

TRUST PLATFORM GUI 112

POLICY DASHBOARD 701

VULNERABILITY MANAGEMENT POLICY SETTINGS PANE 703-1

| VULNERABILITY MANAGEMENT | |
|---|---|
| REMEDIATION TIMELINES | |
| CRITICAL: 10 | MODERATE: 90 |
| HIGH: 30 | LOW: 180 |

DASHBOARD SELECTION PANE
- ALERT DASHBOARD
- VULNERABILITY DASHBOARD
- LOG ANALYTICS
- POLICY
- COMPLIANCE REPORTING
- ASSET MANAGEMENT
- FIREWALL AUDITING
- USER MANAGEMENT
- CLOUD SERVICE PROVIDER MANAGEMENT

TRUST PLATFORM GUI 112

| DASHBOARD SELECTION PANE | POLICY DASHBOARD 701 |
| --- | --- |
| ALERT DASHBOARD | LOG MANAGEMENT POLICY SETTINGS PANE 703-2 |
| VULNERABILITY DASHBOARD | |
| LOG ANALYTICS | |
| POLICY | |
| COMPLIANCE REPORTING | |
| ASSET MANAGEMENT | |
| FIREWALL AUDITING | |
| USER MANAGEMENT | |
| CLOUD SERVICE PROVIDER MANAGEMENT | |

LOG MANAGEMENT

| | LOG FORWARDING | | |
| --- | --- | --- | --- |
| IP ADDRESS | PROTOCOL | PORT | ENABLED (YES/NO) |
| - | - | - | - |

TRUST PLATFORM GUI 112

| DASHBOARD SELECTION PANE | COMPLIANCE DASHBOARD 801 |
|---|---|
| ALERT DASHBOARD | COMPLIANCE REPORTS PANE 803 |
| VULNERABILITY DASHBOARD | |
| LOG ANALYTICS | |
| POLICY | |
| COMPLIANCE REPORTING | |
| ASSET MANAGEMENT | |
| FIREWALL AUDITING | |
| USER MANAGEMENT | |
| CLOUD SERVICE PROVIDER MANAGEMENT | |

COMPLIANCE REPORTS

| REPORT NAME | LAST MODIFIED DATE | SIZE |
|---|---|---|
| COMPLIANCE REPORT 1 | DATE 1 | SIZE 1 |
| COMPLIANCE REPORT 2 | DATE 2 | SIZE 2 |
| COMPLIANCE REPORT 3 | DATE 3 | SIZE 3 |
| ... | ... | ... |

FIG. 8

TRUST PLATFORM GUI 112

ASSET MANAGEMENT DASHBOARD 901

CLOUD ASSET LISTING PANE 903

CLOUD ASSETS

| POWERED ON (Y/N) | CLOUD SERVICE PROVIDER | ASSET TYPE | ASSET NAME | ADDITIONAL ASSET ATTRIBUTE(S) | HOST SECURITY ENABLED (Y/N) | DATA-AT-REST ENCRYPTION ENABLED (Y/N) | ... | ACTIONS |
|---|---|---|---|---|---|---|---|---|
| Y | CSP1 | VM | NAME 1 | ... | Y | N | ... | EDIT/DELETE/ ACCESS |
| Y | CSP2 | VM | NAME 2 | ... | N | N | ... | EDIT/DELETE/ ACCESS |
| N | CSP1 | VM | NAME 3 | ... | Y | Y | ... | EDIT/DELETE/ ACCESS |
| ... | ... | ... | ... | ... | ... | ... | ... | |

DASHBOARD SELECTION PANE
- ALERT DASHBOARD
- VULNERABILITY DASHBOARD
- LOG ANALYTICS
- POLICY
- COMPLIANCE REPORTING
- ASSET MANAGEMENT
- FIREWALL AUDITING
- USER MANAGEMENT
- CLOUD SERVICE PROVIDER MANAGEMENT

FIG. 9A

CLOUD ASSET LISTING PANE 903

CLOUD ASSETS

| POWERED ON (Y/N) | CLOUD SERVICE PROVIDER | ASSET TYPE | ASSET NAME | ADDITIONAL ASSET ATTRIBUTE(S) | HOST SECURITY ENABLED (Y/N) | DATA-AT-REST ENCRYPTION ENABLED (Y/N) | ASSET IMPORTANCE | ASSET RISK | ... | ACTIONS |
|---|---|---|---|---|---|---|---|---|---|---|
| Y | CSP1 | VM | NAME 1 | ... | Y | N | IMPORTANCE VALUE 1 | RISK VALUE 1 | ... | EDIT/DELETE/ ACCESS |
| Y | CSP2 | VM | NAME 2 | ... | N | N | IMPORTANCE VALUE 2 | RISK VALUE 2 | ... | EDIT/DELETE/ ACCESS |
| N | CSP1 | VM | NAME 3 | ... | Y | Y | IMPORTANCE VALUE 3 | RISK VALUE 3 | ... | EDIT/DELETE/ ACCESS |
| ... | ... | ... | | ... | | | ... | ... | ... | |

FIG. 9B

CLOUD ASSET LISTING PANE 903

| POWERED ON (Y/N) | CLOUD SERVICE PROVIDER | ASSET TYPE | ASSET NAME | ... | ASSET IMPORTANCE FACTOR 1 | ASSET IMPORTANCE FACTOR n | ASSET IMPORTANCE | ASSET RISK FACTOR 2 | ... | ASSET RISK FACTOR n | ASSET RISK | ... | ACTIONS |
|---|---|---|---|---|---|---|---|---|---|---|---|---|---|
| Y | CSP1 | VM | NAME 1 | ... | FACTOR 1 VALUE 1 | FACTOR n VALUE 1 | IMPORTANCE VALUE 1 | FACTOR 2 VALUE 1 | ... | FACTOR n VALUE 1 | RISK VALUE 1 | ... | EDIT/ DELETE/ ACCESS |
| Y | CSP2 | VM | NAME 2 | ... | FACTOR 1 VALUE 2 | FACTOR n VALUE 2 | IMPORTANCE VALUE 2 | FACTOR 2 VALUE 2 | ... | FACTOR n VALUE 2 | RISK VALUE 2 | ... | EDIT/ DELETE/ ACCESS |
| N | CSP1 | VM | NAME 3 | ... | FACTOR 1 VALUE 3 | FACTOR n VALUE 3 | IMPORTANCE VALUE 3 | FACTOR 2 VALUE 3 | ... | FACTOR n VALUE 3 | RISK VALUE 3 | ... | EDIT/ DELETE/ ACCESS |
| ... | | | | ... | ... | ... | ... | ... | ... | ... | ... | ... | |

CLOUD ASSETS

FIG. 9C

TRUST PLATFORM GUI 112

FIREWALL AUDITING DASHBOARD 1001

FIREWALL AUDIT REPORTS LISTING PANE 1003

FIREWALL AUDIT REPORTS

| REPORT NAME | LAST MODIFIED DATE | SIZE |
|---|---|---|
| FIREWALL AUDIT REPORT 1 | DATE 1 | SIZE 1 |
| FIREWALL AUDIT REPORT 2 | DATE 2 | SIZE 2 |
| FIREWALL AUDIT REPORT 3 | DATE 3 | SIZE 3 |
| ... | ... | ... |

DASHBOARD SELECTION PANE
- ALERT DASHBOARD
- VULNERABILITY DASHBOARD
- LOG ANALYTICS
- POLICY
- COMPLIANCE REPORTING
- ASSET MANAGEMENT
- FIREWALL AUDITING
- USER MANAGEMENT
- CLOUD SERVICE PROVIDER MANAGEMENT

FIG. 10

TRUST PLATFORM GUI 112

USER MANAGEMENT DASHBOARD 1101

REGISTERED USER LISTING PANE 1103

| USERS | | | | REGISTER USER INTERFACE FEATURE | |
|---|---|---|---|---|---|
| EMAIL | FIRST NAME | LAST NAME | PHONE NUMBER | CUSTOMER ACCOUNT | ACTIONS |
| EMAIL 1 | FIRST NAME 1 | LAST NAME 1 | PHONE NUMBER 1 | ACCOUNT 1 | EDIT/DELETE |
| EMAIL 2 | FIRST NAME 2 | LAST NAME 2 | PHONE NUMBER 2 | ACCOUNT 2 | EDIT/DELETE |
| EMAIL 3 | FIRST NAME 3 | LAST NAME 3 | PHONE NUMBER 3 | ACCOUNT 1 | EDIT/DELETE |
| ... | ... | ... | | | |

DASHBOARD SELECTION PANE

- ALERT DASHBOARD
- VULNERABILITY DASHBOARD
- LOG ANALYTICS
- POLICY
- COMPLIANCE REPORTING
- ASSET MANAGEMENT
- FIREWALL AUDITING
- USER MANAGEMENT
- CLOUD SERVICE PROVIDER MANAGEMENT

TRUST PLATFORM GUI 112

CLOUD SERVICE PROVIDER MANAGEMENT DASHBOARD 1201

REGISTERED CLOUD SERVICE PROVIDER LISTING PANE 1203

[ REGISTER CLOUD SERVICE PROVIDER INTERFACE FEATURE ]

ONBOARDED CLOUD SERVICE PROVIDERS

| NAME | CLOUD SERVICE PROVIDER | PUBLIC KEY | ACTIONS |
|---|---|---|---|
| CSP NAME 1 | CSP 1 | PUBLIC KEY 1 | EDIT/DELETE |
| CSP NAME 2 | CSP 2 | PUBLIC KEY 2 | EDIT/DELETE |
| CSP NAME 3 | CSP 3 | PUBLIC KEY 3 | EDIT/DELETE |
| ... | ... | ... | |

DASHBOARD SELECTION PANE
- ALERT DASHBOARD
- VULNERABILITY DASHBOARD
- LOG ANALYTICS
- POLICY
- COMPLIANCE REPORTING
- ASSET MANAGEMENT
- FIREWALL AUDITING
- USER MANAGEMENT
- CLOUD SERVICE PROVIDER MANAGEMENT

RELATIVE RISK RANKING OF CLOUD ASSETS USED IN MULTI-CLOUD WORKLOADS

FIELD

The field relates generally to information processing, and more particularly to techniques for managing information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult to provision cloud services in multi-cloud environments.

SUMMARY

Illustrative embodiments disclosed herein provide techniques for relative risk ranking of cloud assets used in multi-cloud workloads.

In one embodiment, an apparatus comprises at least one processing device comprising a processor coupled to a memory. The at least one processing device is configured to perform the step of receiving, at a user interface of a trust platform configured to manage a plurality of cloud assets operating in clouds of two or more cloud service providers, a request to view multi-cloud relative risk information for at least a subset of the plurality of cloud assets operating in the clouds of the two or more cloud service providers on which one or more workloads of a given entity run. The at least one processing device is further configured to perform the steps of obtaining, utilizing one or more application programming interfaces of the trust platform, a first set of cloud asset risk data generated by a first plurality of monitoring tools operating in tenant environments of the clouds of the two or more cloud service providers, and obtaining, utilizing the one or more application programming interfaces of the trust platform, a second set of cloud asset risk data generated by a second plurality of monitoring tools operating in management environments of the clouds of the two or more cloud service providers. The at least one processing device is further configured to perform the steps of generating a unified view of the multi-cloud relative risk information for the subset of the plurality of cloud assets operating in the clouds of the two or more cloud service providers on which one or more workloads of the given entity run utilizing the first set of cloud asset risk data and the second set of cloud asset risk data, and providing, at the user interface of the trust platform, the unified view of the multi-cloud relative risk information for the subset of the plurality of cloud assets operating in the clouds of the two or more cloud service providers on which one or more workloads of the given entity run.

These and other illustrative embodiments include, without limitation, methods, apparatus, networks, systems and processor-readable storage media.

BRIEF DESCRIPTION OF THE DRAWINGS

FIGS. 4A-4D show views of an alert dashboard of a trust platform graphical user interface in an illustrative embodiment.

FIGS. 5A-5C show views of a vulnerability dashboard of a trust platform graphical user interface in an illustrative embodiment.

FIG. 6 shows a view of a log analytics dashboard of a trust platform graphical user interface in an illustrative embodiment.

FIGS. 7A and 7B show views of a policy management dashboard of a trust platform graphical user interface in an illustrative embodiment.

FIG. 8 shows a view of a compliance reporting dashboard of a trust platform graphical user interface in an illustrative embodiment.

FIGS. 9A-9C show views of an asset management dashboard of a trust platform graphical user interface in an illustrative embodiment.

FIG. 10 shows a view of a firewall auditing dashboard of a trust platform graphical user interface in an illustrative embodiment.

FIG. 11 shows a view of a user management dashboard of a trust platform graphical user interface in an illustrative embodiment.

FIG. 12 shows a view of a cloud service provider management dashboard of a trust platform graphical user interface in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
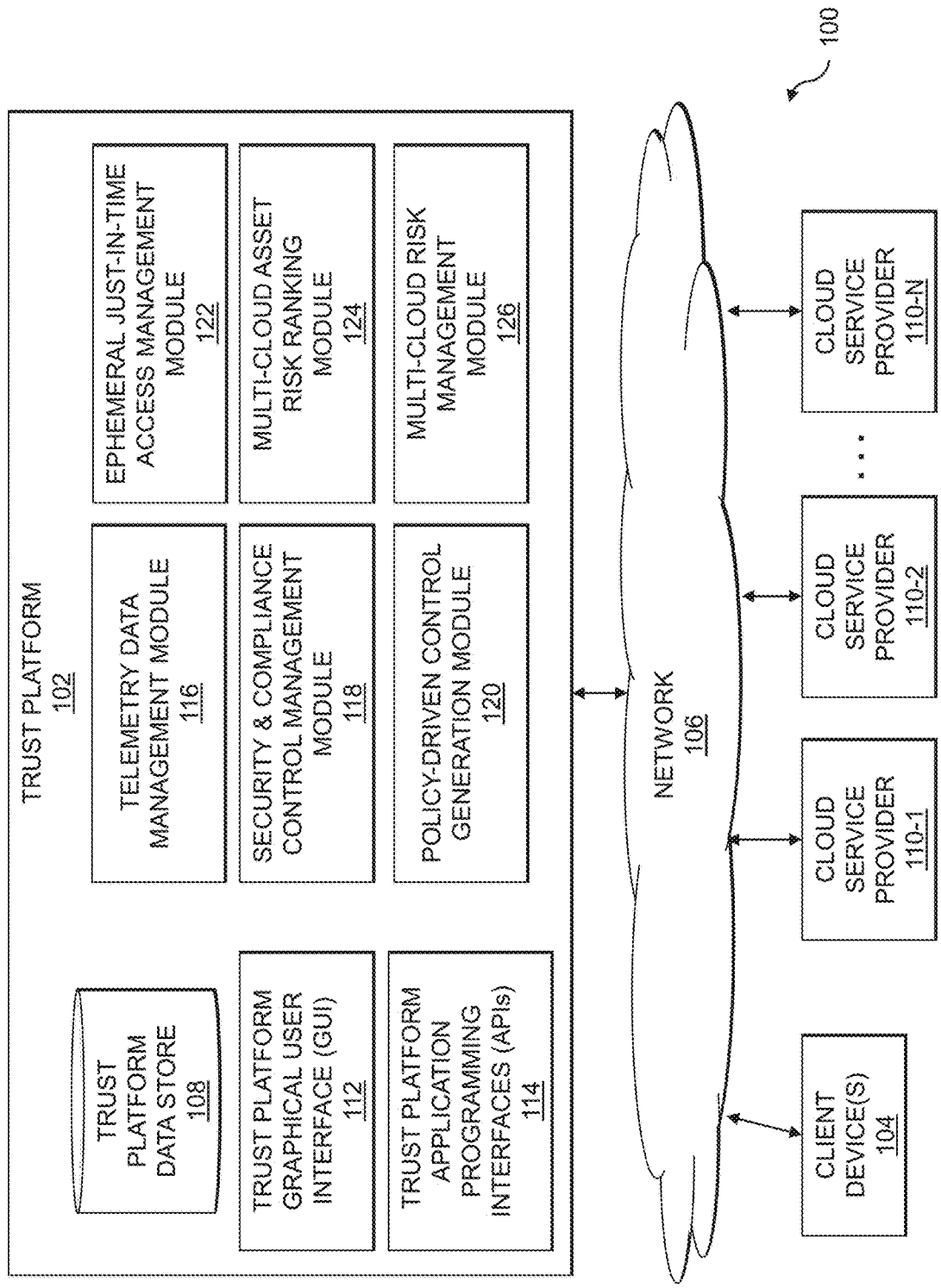
FIG. 1 is a block diagram of an information processing system configured for management of cloud assets operating on clouds of multiple cloud service providers in an illustrative embodiment.

FIG. 1 shows an information processing system 100 configured in accordance with an illustrative embodiment. The information processing system 100 is assumed to be built on at least one processing platform and provides functionality for management of cloud assets operating on clouds of multiple cloud service providers. The information processing system 100 includes a trust platform 102, which is coupled via a network 106 to a set of cloud service providers (CSPs) 110-1, 110-2, . . . 110-N (collectively, cloud service providers or CSPs 110). Each of the CSPs 110 is assumed to operate one or more clouds. Also coupled to the network 106 is a set of client devices 104. In some embodiments, the trust platform 102 itself runs on a cloud of one or more of the CSPs 110, or on one or more clouds of a distinct CSP that are not part of CSPs 110.

The client devices 104 in the system 100 may comprise, for example, physical computing devices such as Internet of Things (IoT) devices, mobile telephones, laptop computers, tablet computers, desktop computers or other types of devices utilized by members of an enterprise or other entity, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise or entity. At least portions of the system 100 may thus be referred to herein as collectively comprising an "enterprise." In some embodiments, client devices 104 are operated by users that run workloads or applications using cloud assets of clouds operated by the CSPs 110. For example, a given user may comprise a customer of one or more of the CSPs 110 that deploys workloads or applications using cloud assets of the clouds operated by the CSPs 110. The given user can utilize one of the client devices 104 to access the trust platform 102 to manage various aspects of such cloud assets. In some cases, the given user may represent an organization (e.g., a business, enterprise or other entity that is a tenant or subscriber of the CSPs 110). Depending on permissions, the given user may manage all or some subset of that organization's cloud assets across the CSPs 110. For example, the given user may be an administrator or authorized user for the organization as a whole and thus have access to manage all of the cloud assets for that organization. The given user may alternatively be an administrator or authorized user for only part of an organization, such as a particular business unit or division of the organization, and thus would only have access to manage the cloud assets of that business unit or division. As yet another example, a given user may be an administrator or other authorized user that manages the trust platform 102 itself, and therefore the given user may utilize the trust platform 102 to manage the cloud assets of multiple other users (e.g., multiple organizations). Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The trust platform 102, as shown in FIG. 1, includes a trust platform data store 108. The trust platform data store 108 may by any type of database or other data store that is configured to store information related to cloud assets of the CSPs 110, including but not limited to telemetry data, security and compliance policies, security and compliance controls, access credentials, etc. The trust platform data store 108 in some embodiments is implemented using one or more storage systems or devices associated with the trust platform 102. In some embodiments, one or more of the storage systems utilized to implement the trust platform data store 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the trust platform 102, client devices 104, CSPs 110, etc., as well as to support communication between such components and other related systems and devices not explicitly shown.

In some embodiments, the client devices 104 may implement host agents that are configured for communication with the trust platform 102. The host agents implemented by the client devices 104 may be configured to interact with a graphical user interface (GUI) 112 of the trust platform 102, for performing various management tasks for cloud assets of the CSPs 110. It should be noted that a "host agent" as this term is generally used herein may comprise an automated entity, such as a software entity running on a processing device. Accordingly, a host agent need not be a human entity.

Although shown as separate from the client devices 104 and the CSPs 110 in the FIG. 1 embodiment, it should be appreciated that the trust platform 102 may be implemented at least in part within one or more of the client devices 104 or at least in part within one or more of the CSPs 110, or combinations thereof, in some embodiments.

The trust platform 102 in the FIG. 1 embodiment is assumed to be implemented using at least one processing device. Each such processing device generally comprises at least one processor and an associated memory, and implements one or more functional modules for controlling certain features of the trust platform 102, such as the trust platform GUI 112 and trust platform application programming interfaces (APIs) 114. In the FIG. 1 embodiment, the trust platform 102 implements a telemetry data management module 116, a security and compliance control management module 118, a policy-driven control generation module 120, an ephemeral just-in-time access management module 122, a multi-cloud asset risk ranking module 124, and a multi-cloud risk management module 126.

As discussed above, the client devices 104 are assumed to be utilized by users to access clouds of the CSPs 110, and to access the trust platform 102 for managing cloud assets operated by the users on the clouds of the CSPs 110. For example, a given user may be an end-user or customer that is a tenant or subscriber of one or more of the CSPs 110. The given user may utilize one of the client devices 104 to login to the trust platform 102 to manage cloud assets (e.g., virtual machines (VMs), software containers, etc.) operating on the clouds of the CSPs 110 on which the given user's workloads run.

The trust platform 102 implements the trust platform GUI 112 to provide users with a "single pane of glass" for managing cloud assets on any combination of the CSPs 110. To do so, the trust platform 102 utilizes the trust platform APIs 114 to interact with the various CSPs 110 (e.g., to collect data from the various CSPs 110 which may be aggregated and formatted for view in a dashboard of the trust platform GUI 112, to deploy controls and manage accounts for cloud assets, etc.). Data collected from the various cloud assets by the trust platform APIs 114 may be stored in the trust platform data store 108. The trust platform GUI 112 includes various interface features that facilitate automated management of the cloud assets through use of the trust platform APIs 114 and the functionality of the modules 116 through 126.

The telemetry data management module 116 of the trust platform 102 provides functionality for enabling real-time or near real-time visibility of security and compliance telemetry across all the cloud assets of a user or set of users (e.g., a business, organization, enterprise or other entity). Security and compliance telemetry data may exist in many different independent data silos. Thus, it is difficult to obtain a consolidated overview of the security and compliance landscape for a particular user or set of users without requiring complex integration and manual review. Conventional approaches, such as the use of security information and event management (SIEM) tools for logging and alerting of security events, do not give a holistic view of security and compliance across hybrid and multi-cloud workloads. Obtaining such a holistic view may require utilizing multiple tools and services from many different vendors which may be different across multiple cloud platforms, and each tool or service has its own learning curve.

Consider, by way of example, a customer that runs a given workload or application using cloud assets of two of the CSPs 110 (e.g., CSP 110-1 and CSP 110-2). Each of the CSPs 110-1 and 110-2 may have its own set of tools and services which provide telemetry data (e.g., SIEM tools from different vendors). Thus, the customer would be required to separately utilize the SIEM tools of the CSP 110-1 and the CSP 110-2 just to get SIEM data for the given workload. It should be noted that SIEM tools may provide only part of the information needed to get a holistic view of security and compliance for the given workload. Obtaining additional data (e.g., for network intrusion detection and prevention, anti-virus, anti-malware, host-based firewall, encryption, etc.) may require the use of many more tools, which again may be provided by different vendors for different ones of the CSPs 110. Thus, there are significant challenges for the user that seeks to obtain a holistic view of security and compliance across hybrid and multi-cloud workloads. The cybersecurity system for hybrid and multi-cloud workloads may require deployment of an average of about 50 different cybersecurity solutions and technologies for a single customer to obtain a holistic view of security and compliance across hybrid and multi-cloud workloads. This complex ecosystem leads to a lack of timely visibility, which contributes to data breaches and other security issues. Further, there may be a shortage of skilled information technology (IT) professionals for managing such complex ecosystems of cybersecurity solutions.

The telemetry data management module 116 advantageously brings together such security and compliance telemetry data to provide a unified view (e.g., via the "single pane of glass" of the trust platform GUI 112) for characterizing security, compliance and business risk across multi-cloud and hybrid workloads.

The security and compliance control management module 118 of the trust platform 102 is configured to provide consolidated security and compliance controls for hybrid and multi-cloud workloads. As discussed above, a full cybersecurity tooling stack may require many different vendor tools which may not inter-operate with one another. This makes it a difficult and time-consuming manual task to holistically deploy security and compliance controls across hybrid and multi-cloud workloads. Each individual cybersecurity tool or service (e.g., for network intrusion detection and prevention, anti-virus, anti-malware, host-based firewall, encryption, etc.) operates in its own silo within its own domain, and typically lacks adequate inter-operability with other cybersecurity tools and services. Thus, a user or set of users which runs hybrid or multi-cloud workloads may be required to manage a large number of different cybersecurity tools and services across multiple vendor-specific silos. This adds complexity, and makes deployment of security and compliance controls a time-consuming and error-prone manual task which has a significant learning curve for multiple cybersecurity tools and services (e.g., as each cybersecurity tool may have a separate learning curve).

The security and compliance control management module 118 is configured to utilize the trust platform GUI 112 to provide a consolidated portal for end-users to manage security and compliance controls in a unified manner across hybrid and multi-cloud workloads. The security and compliance control management module 118 may utilize the trust platform APIs 114 to automate management and delivery of the security and compliance controls across all managed cloud assets for a particular user or set of users across all of the cloud assets of that user or set of users in the different clouds of the CSPs 110. Advantageously, this allows the trust platform 102 to resolve control gaps across hybrid and multi-cloud workloads in a unified way.

The policy-driven control generation module 120 of the trust platform 102 is configured to utilize the trust platform GUI 112 to provide a consolidated portal for end-users to manage security and compliance policies in a unified manner across hybrid and multi-cloud workloads. As discussed above, the large number of cybersecurity tools from many vendors do not allow holistic management of security and compliance controls across hybrid and multi-cloud workloads. Thus, it is a complex and time-consuming manual task to effectively deploy security and compliance controls that conform to user-specific policies (e.g., for a user that is an organization such as a business, organization-approved security and compliance policies). For example, a user may have cloud assets operating on clouds of multiple ones of the CSPs 110, and seek to specify a set of security and compliance policies to be deployed for all of that user's cloud assets. The user may utilize the consolidated portal of the trust platform GUI 112 to specify such security and compliance policies, and the policy-driven control generation module 120 may analyze such security and compliance policies to determine corresponding sets of security and compliance controls to be deployed (e.g., using trust platform APIs 114) on the cloud assets to satisfy the specified security and compliance policies. In this way, the trust platform 102 enables automated management and delivery of security and compliance controls based on user-approved policy across all cloud assets of that user. Advantageously, this resolves control gaps for hybrid and multi-cloud workloads in a unified way, enabling adherence to user-specified policy.

The ephemeral just-in-time access management module 122 of the trust platform 102 is configured to manage accounts for cloud assets (e.g., used to run hybrid and multi-cloud workloads). Access management for operating systems (OSes) and applications typically requires static, unique accounts to be created. The higher the number of users, the higher the attack surface for the OSes and applications. This makes it difficult to manage user accounts for different trust zones, and can lead to inconsistencies. Some approaches to access management utilize single sign-on (SSO), lightweight directory access protocol (LDAP), and privileged account management solutions (e.g., Centrify®, CyberArk®). These approaches, however, require administrator accounts to exist on a system in sufficient quantities to manage assets, thus increasing the attack surface area. The ephemeral just-in-time access management module 122 may utilize a single, easy to monitor limited access process account to manage ephemeral or temporary user accounts. Accounts for specific cloud assets may be requested through the trust platform GUI 112, and are created programmatically and destroyed automatically after use by the ephemeral just-in-time access management module 122 utilizing the trust platform APIs 114. Advantageously, the just-in-time user credentials only exist on a system when in use, thus reducing the attack surface area.

The multi-cloud asset risk ranking module 124 of the trust platform 102 is configured to utilize the trust platform GUI 112 and trust platform APIs 114 to determine and display multi-cloud asset risk ranking information for cloud assets across hybrid and multi-cloud workloads. The multi-cloud asset risk ranking information may include relative rankings of asset risk for different cloud assets used for hybrid and multi-cloud workloads. Asset tagging and ranking across multi-cloud workloads may exist in many data silos, and require complex integration and manual reviews to get a relative view of the multi-cloud relative risk of cloud assets. For example, an asset management tool reporting asset tagging and ranking does not account for relative risk or importance of the cloud platforms on which the cloud assets run, as well as security controls and features deployed on the cloud assets (e.g., containers, VMs, network segments, etc.) and the cloud platforms on which the cloud assets run.

The trust platform 102 has access to data from multiple sources (e.g., via monitoring tools deployed or operating in tenant environments of the CSPs 110, monitoring tools deployed or operating in management environments of the CSPs 110, etc.) that can be used to rank the relative risk of different cloud assets (e.g., based on vulnerabilities and alerts for the cloud assets, exposure to other cloud assets, firewall audits, etc.) across multiple clouds. Such multi-cloud relative risk may include characterizing cloud assets across multiple clouds using multiple different types of data. For example, if a cloud asset is an authentication server or domain controller and does not have the necessary security controls relevant to a cloud platform, that cloud asset may be tagged as "trust: domaincontroller, trust: highvalueasset."

Conventional approaches do not provide functionality for tagging and ranking cloud assets based on a holistic view of relative risk for a multi-cloud environment. As an example, an asset management tool that reports asset tagging and ranking may not account for relative importance to a cloud platform and security controls deployed on a cloud asset (e.g., a VM). If the cloud asset (e.g., the VM) has host and network security controls like encryption, intrusion detection anti-malware, cloud platform firewall, etc., this may not be accounted for by the asset management tool when tagging and ranking that asset. The multi-cloud asset risk ranking module 124, which utilizes the trust platform APIs 114 of the trust platform 102 to gather information across multiple CSPs 110 using a plurality of monitoring tools, can advantageously leverage such information to determine multi-cloud relative asset risk information (e.g., rankings). The multi-cloud asset risk ranking module 124 is further configured to utilize the trust platform GUI 112 to display multi-cloud relative asset risk information, and utilize such multi-cloud relative asset risk information for managing cloud assets as described elsewhere herein.

The multi-cloud risk management module 126 of the trust platform 102 is configured to utilize the trust platform GUI 112 and trust platform APIs 114 to determine and display multi-cloud risk information for cloud assets across hybrid and multi-cloud workloads. Security risk information across hybrid and multi-cloud workloads may exist in many data silos, requiring complex integration and manual review to get a holistic and accurate view of security risk for cloud assets. For example, a security scanner reporting risk related to a missing patch for a given cloud asset does not account for relative risk of the cloud platform and security controls deployed on the given cloud asset. The trust platform 102, via the trust platform APIs 114, has access to alerts, vulnerabilities, firewall audits, etc., that are reported by different cloud assets via various monitoring tools (e.g., monitoring tools deployed or operating in tenant environments of the CSPs 110, monitoring tools deployed or operating in management environments of the CSPs 110, etc.).

Cloud assets, or tools monitoring the cloud assets, may self-report the risk or criticality of a vulnerability or alert. For example, a VM running a given OS may self-report a vulnerability that a provider of the given OS rates as critical or non-critical. This self-reported risk may not be representative of the multi-cloud relative risk for the cloud asset. Consider that the VM may have an external surface area (e.g., it may be accessed from outside the cloud on which it runs), host security features, data-at-rest encryption, etc. If so, a self-reported non-critical risk may actually be much higher, due to the attack area exposed by that VM, lack of host security features of the VM, lack of data-at-rest encryption on the VM, etc. Similarly, a self-reported critical risk of a VM may actually be much lower if that VM does not have an external surface area, or has host security features and data-at-rest encryption enabled, etc. By aggregating data from multiple tools, the multi-cloud risk management module 126 can determine multi-cloud relative risk for cloud assets. Conventional approaches which report risk related to a specific issue without accounting for the multi-cloud environment suffer from various disadvantages. For example, a security scanner reporting risk related to a missing patch may not necessarily account for relative risk of the cloud platform and security controls deployed on the cloud assets (e.g., host and network security controls like encryption, intrusion detection, anti-malware, cloud platform firewall, etc.). The multi-cloud risk management module 126, which takes into account such information, provides more accurate and holistic views of multi-cloud relative risk.

Various functionality of the trust platform 102, including functionality of the trust platform data store 108, the trust platform GUI 112, the trust platform APIs 114, the telemetry data management module 116, the security and compliance control management module 118, the policy-driven control generation module 120, the ephemeral just-in-time access management module 122, the multi-cloud asset risk ranking module 124, and the multi-cloud risk management module 126, will be described in further detail below.

It is to be appreciated that the particular arrangement of the trust platform 102, client devices 104 and CSPs 110 illustrated in the FIG. 1 embodiment is presented by way of example only, and alternative arrangements can be used in other embodiments. As discussed above, for example, the trust platform 102, or portions thereof such as the trust platform data store 108, the trust platform GUI 112, the trust platform APIs 114, the telemetry data management module 116, the security and compliance control management module 118, the policy-driven control generation module 120, the ephemeral just-in-time access management module 122, the multi-cloud asset risk ranking module 124, and the multi-cloud risk management module 126, may in some embodiments be implemented internal to one or more of the client devices 104, one or more of the CSPs 110, or combinations thereof. As another example, the functionality associated with the telemetry data management module 116, the security and compliance control management module 118, the policy-driven control generation module 120, the ephemeral just-in-time access management module 122, the multi-cloud asset risk ranking module 124, and the multi-cloud risk management module 126 may be combined into fewer modules, or separated across more modules with the multiple modules possibly being implemented with multiple distinct processors or processing devices.

At least portions of the telemetry data management module 116, the security and compliance control management module 118, the policy-driven control generation module 120, the ephemeral just-in-time access management module 122, the multi-cloud asset risk ranking module 124, and the multi-cloud risk management module 126 may be implemented at least in part in the form of software that is stored in memory and executed by a processor.

It is to be understood that the particular set of elements shown in FIG. 1 for management of cloud assets operating on clouds of multiple cloud service providers is presented by way of illustrative example only, and in other embodiments additional or alternative elements may be used. Thus, another embodiment may include additional or alternative systems, devices and other network entities, as well as different arrangements of modules and other components.

The trust platform 102 may run on a host cloud or otherwise be part of cloud infrastructure as will be described in further detail below. The cloud infrastructure hosting the trust platform 102 may also host one or more of the client devices 104 or other components of the system 100.

The trust platform 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The trust platform 102, client devices 104 and CSPs 110 or components thereof may be implemented on respective distinct processing platforms, although numerous other arrangements are possible. For example, in some embodiments at least portions of the trust platform 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the trust platform 102, client devices 104, CSPs 110, or portions or components thereof, to reside in different data centers. Numerous other distributed implementations are possible. The trust platform 102 or portions thereof can also be implemented in a distributed manner across multiple data centers.

Additional examples of processing platforms utilized to implement the trust platform 102 and other portions of the system 100 in illustrative embodiments will be described in more detail below in conjunction with FIGS. 21 and 22.

It is to be appreciated that these and other features of illustrative embodiments are presented by way of example only, and should not be construed as limiting in any way.

Figure 2A:
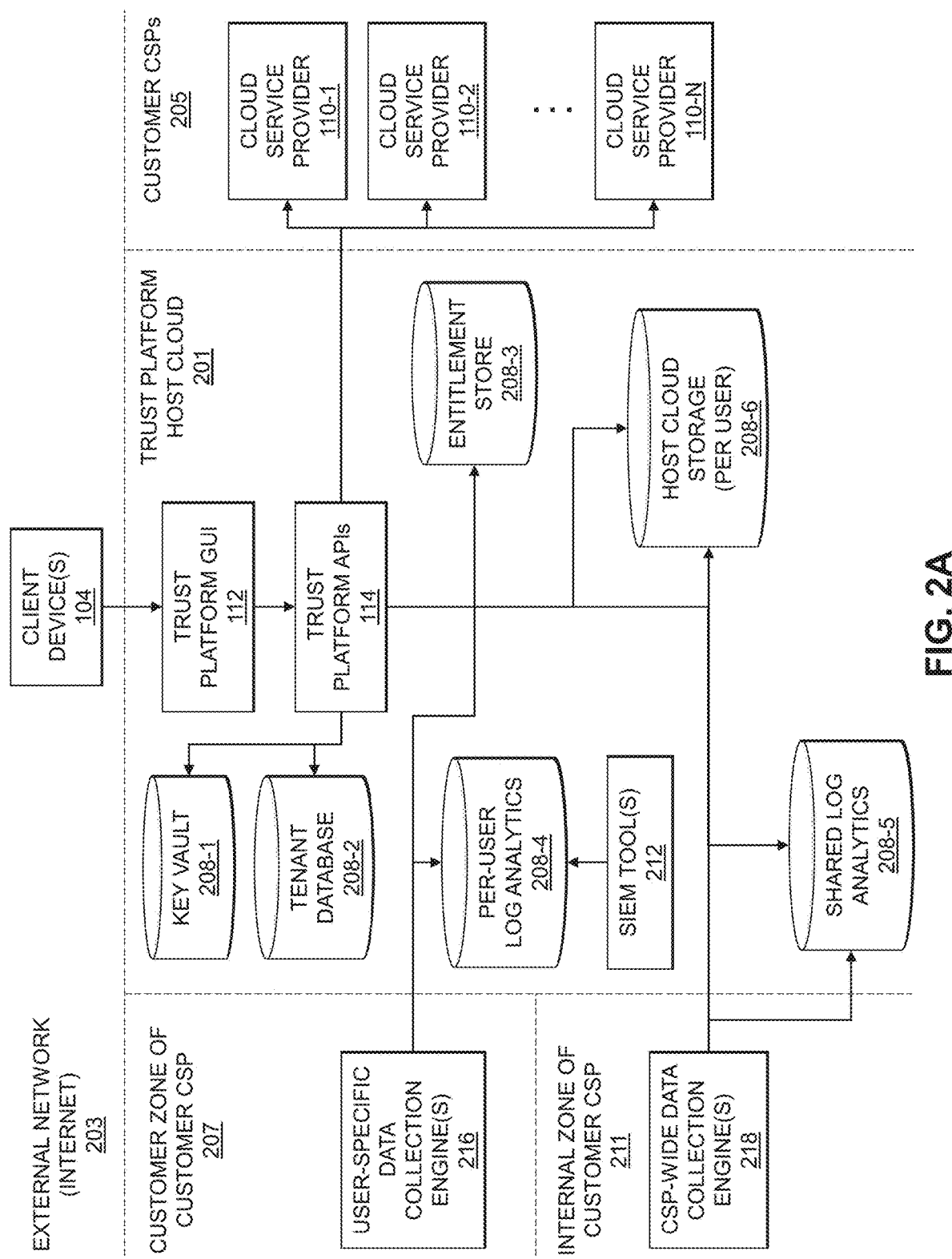
FIGS. 2A-2D illustrate an architecture for implementing a trust platform on a host cloud in an illustrative embodiment.

As noted above, in some embodiments the trust platform 102 may be implemented on a host cloud (e.g., which may be a cloud operated by one of the CSPs 110, a distinct cloud, etc.). FIGS. 2A-2D illustrate an example system architecture for implementing the trust platform 102 on a host cloud. As shown in FIG. 2A, the trust platform 102 (represented here by the trust platform GUI 112 and trust platform APIs 114) runs on a trust platform host cloud 201. The trust platform GUI 112 is accessed by the client devices 104 (e.g., using web browsers or other applications running thereon), where the client devices 104 are on an external network 203 relative to the trust platform host cloud 201. The external network 203 may comprise, for example, the Internet. The trust platform 102, via the trust platform APIs 114, is configured to pull information from customer CSPs 205 (e.g., the CSPs 110). While FIG. 2A illustrates the trust platform host cloud 201 as being separate from the customer CSPs 205, this is not a requirement. For example, the same cloud infrastructure providing clouds of one of the CSPs 110 may also provide the trust platform host cloud 201 for the trust platform 102 (e.g., the trust platform 102 may run on a Virtustream Enterprise Cloud (VEC), where the VEC also hosts cloud assets that are managed by the trust platform 102).

Figure 2B:
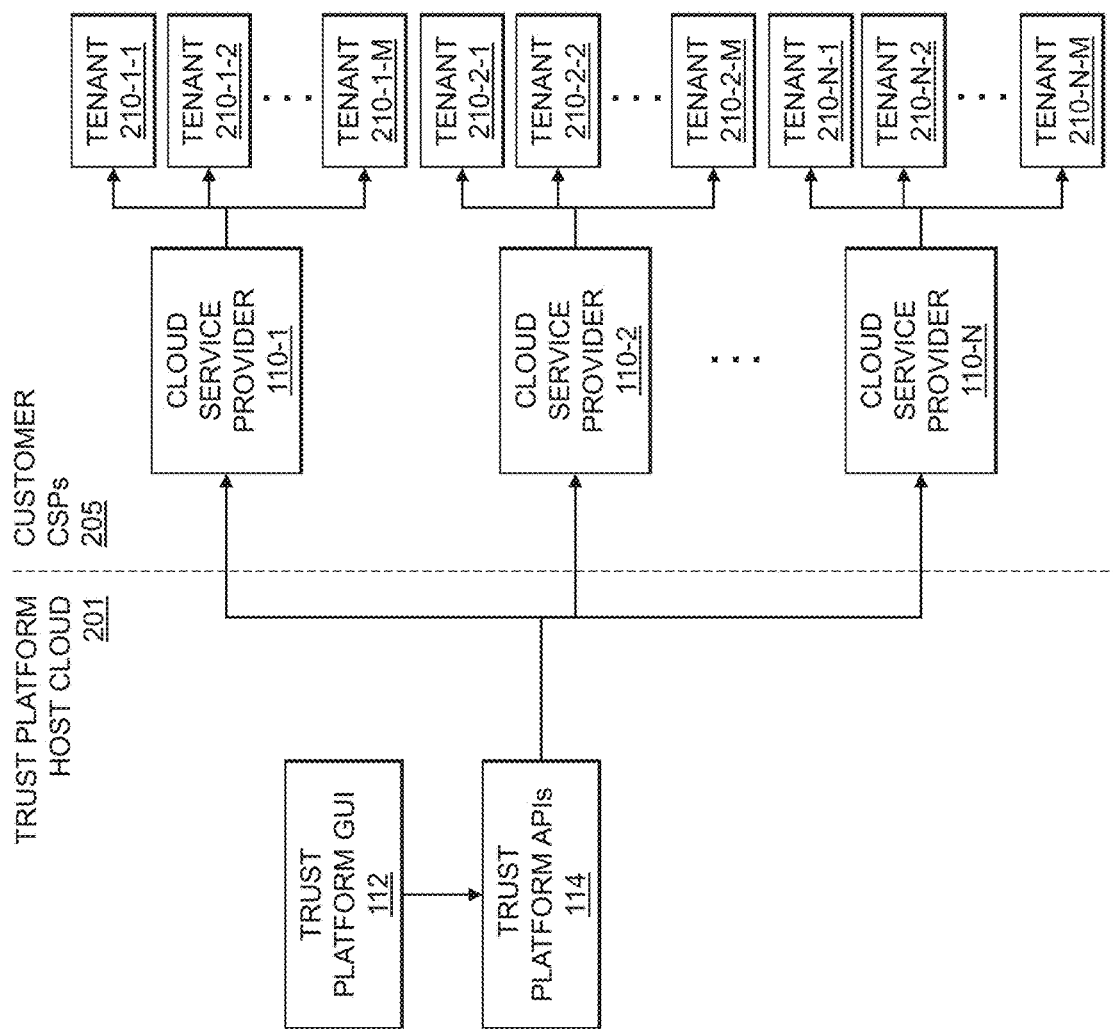

As shown in more detail in FIG. 2B, the trust platform APIs 114 may collect various information from the CSPs 110 in the customer CSPs 205. It should be noted that, in FIGS. 2A-2D, connections between some elements are shown as directional (e.g., the trust platform APIs 114 have arrows pointing to the CSPs 110). The direction of the arrows is used in FIGS. 2A-2D to denote initiation of a connection through a stateful firewall. Communication between any of the elements of FIGS. 2A-2D is assumed to be bidirectional unless otherwise noted. Each of the CSPs 110 may host a set of tenants. For example, the cloud service provider 110-1 hosts a set of tenants 210-1-1, 210-1-2, ... 210-1-M (collectively, tenants 210-1), the cloud service provider 110-2 hosts a set of tenants 210-2-1, 210-2-2, ... 210-2-M (collectively, tenants 210-2), and the cloud service provider 110-N hosts a set of tenants 210-N-1, 210-N-2, ... 210-N-M (collectively, tenants 210-N). It should be appreciated that the number "M" of each of the tenants 210-1, 210-2, 210-N (collectively, tenants 210) may vary. For example, the number M of tenants 210-1 of CSP 110-1 may be different than the number M of tenants 210-2 of CSP 110-2. In the context of FIG. 2B, the use of the term "tenants" refers to a hierarchical organization of the CSPs 110. Different types of CSPs 110 may utilize different terminology for their hierarchical organization of customers or end-users. For example, a Microsoft Azure CSP may refer to tenants as "subscriptions" where an Amazon Web Services (AWS) refers to "organizations" and a Virtustream xStream® may refer to RIDs. Various other examples are possible.

Returning to FIG. 2A, the trust platform host cloud 201 includes a number of additional elements. In FIG. 2A, the trust platform data store 108 is represented using a number of different data stores in the trust platform host cloud 201 for clarity of illustration, including a key vault 208-1, tenant database 208-2, entitlement store 208-3, per-user log analytics store 208-4, shared log analytics store 208-5, and host cloud storage 208-6 (e.g., per-user or per-customer storage).

The key vault 208-1 may store keys for the trust platform 102, credentials for accessing CSPs 110, etc. The trust platform APIs 114, when accessing the CSPs 110, may obtain any necessary credentials from the key vault 208-1.

The tenant database 208-2 may include mappings between users (e.g., customers) and globally unique identifiers (GUIDs) of the trust platform host cloud 201. Where the trust platform host cloud 201 is a Microsoft Azure cloud, the key vault 208-1 may comprise an Azure Key Vault and the tenant database 208-2 may comprise a Banham Vault (e.g., an encrypted Cosmos database using the keys stored in the Azure Key Vault). The Azure Key Vault may store per-tenant encryption keys used to encrypt user information, and the Banham value may store users' credentials to access customer systems.

The entitlement store 208-3 may comprise a configuration management database (CMDB) for cloud assets (e.g., hosted by CSPs 110) and associated user or customer entitlements for such assets. The entitlement store 208-3, in some embodiments, may be implemented using a ServiceNow® CMDB.

The per-user log analytics store 208-4 is configured to store logs for different users, such as using a workspace for each user or customer defined by the GUIDs stored in the tenant database 208-2. The per-user log analytics store 208-4 in some embodiments stores data generated by user or customer systems (e.g., data generated by various monitoring tools in the customer zone 207 of a customer CSP). Each workspace in the per-user log analytics store 208-4 is dedicated to a particular user or customer. The trust platform host cloud 201 also implements one or more SIEM tools 212 that are coupled to the per-user log analytics store 208-4. The SIEM tools 212 (e.g., Azure Sentinel), similar to the per-user log analytics store 208-4, may include a workspace for each user or customer defined by the GUIDs stored in the tenant database 208-2.

The shared log analytics store 208-5 is configured to store logs that are generated by CSPs 110 themselves (e.g., data generated by various monitoring tools in the internal zone 211 of a customer CSP 205). The shared log analytics store 208-5 may include a workspace for alerts, vulnerabilities, etc., which may be filtered by tenant.

The host cloud storage 208-6 is configured to store various reports (e.g., firewall audit reports, vulnerability reports, etc.) or other data generated by various monitoring tools in the internal zone 211 of a customer CSP.

Figure 2C:
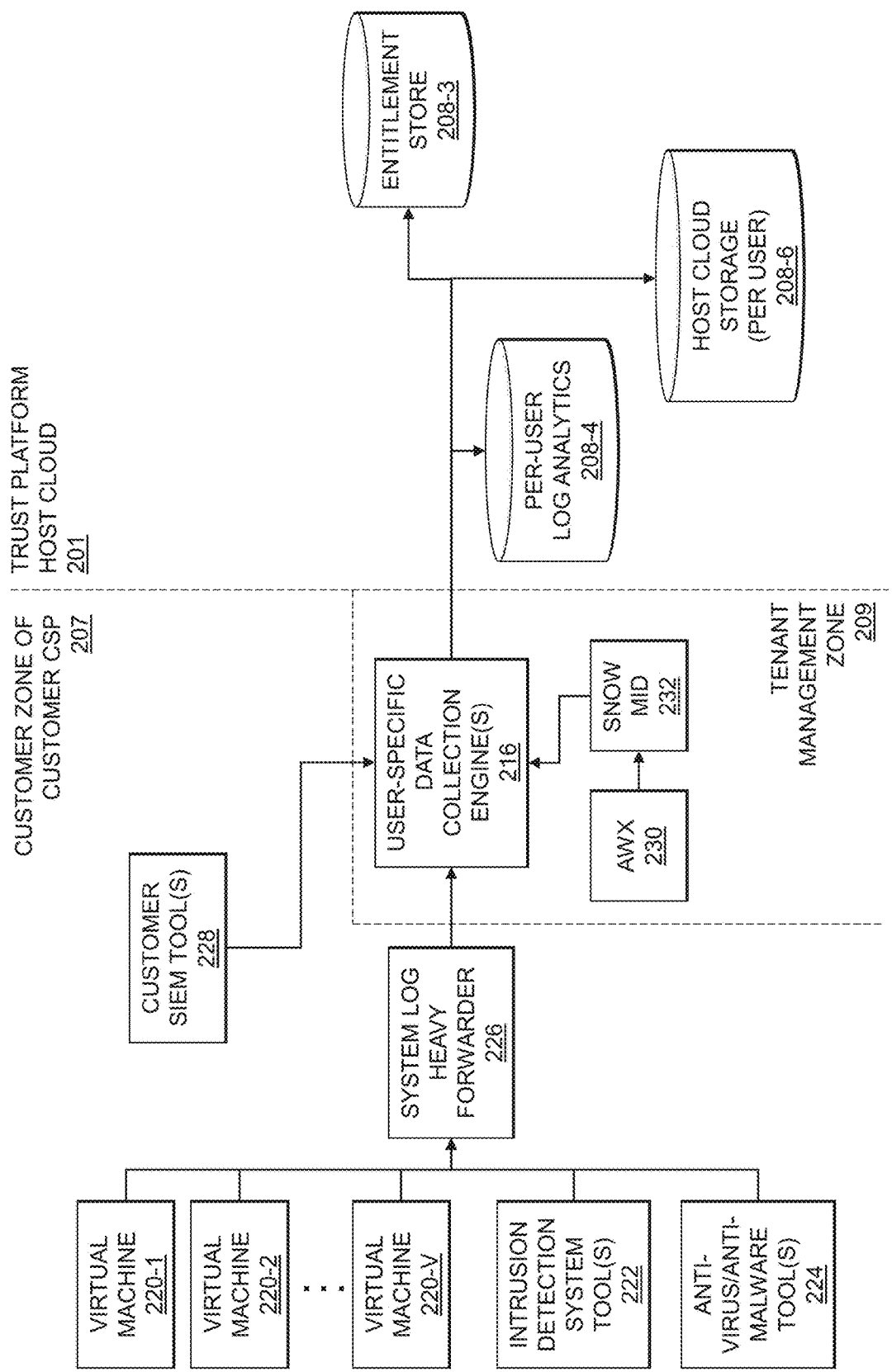

FIG. 2C illustrates further details of the customer zone 207 of the customer CSP, which pushes data to the entitlement store 208-3, per-user log analytics store 208-4, and host cloud storage 208-6 via one or more user-specific data collection engines 216. The user-specific data collection engines 216 are shown in FIG. 2C as being implemented within a tenant management zone 209 of the customer zone 207. In some embodiments, the user-specific data collection engines 216 comprise a Logstash® Container. The user-specific data collection engines 216 receive data from various VMs 220-1, 220-2, ... 220-V (collectively, VMs 220), intrusion detection system (IDS) tools 222, and anti-virus/anti-malware tools 224 in the customer zone 207 via a system log heavy forwarder 226. The user-specific data collection engines 216 also receive data from customer SIEM tools 228 in the customer zone 207.

The VMs 220 are examples of cloud assets running in the customer zone 207, which may be managed using the trust platform 102. Such VMs 220 or other cloud assets may provide telemetry data to the trust platform 102, and may be at least partially controlled by the trust platform APIs 114 of the trust platform 102 (e.g., based on security and compliance controls, including policy-driven security and compliance controls, deployed by the trust platform 102 using trust platform APIs 114). The trust platform 102 may also generate ephemeral just-in-time accounts for the VMs 220 or other cloud assets as described in further detail elsewhere herein.

The IDS tools 222 may include one or multiple IDS tools (e.g., such as Fortinet® Fortigate, etc.) that run in the customer zone 207. The anti-virus/anti-malware tools 224 may similarly include one or multiple anti-virus/anti-malware tools (e.g., Trend Micro™ DSM) that run in the customer zone 207.

The user-specific data collection engines 216, as noted above, may operate in the tenant management zone 209 of the customer zone 207. The tenant management zone 209 may also include an Ansible® WorkX or Ansible® Open-source Tower (AWX) element 230 and a ServiceNow® Management Instrumentation and Discovery server (SNOW MID) element 232. The AWX element 230 provides a configuration management solution used to make configuration changes on tenant systems (e.g., installing and configuring agents on customer VMs). The SNOW MID element 232 is used as a bridge so that the AWX element 230 can communicate with ServiceNow®, which provides an IT Service Management (ITSM) solution.

Figure 2D:
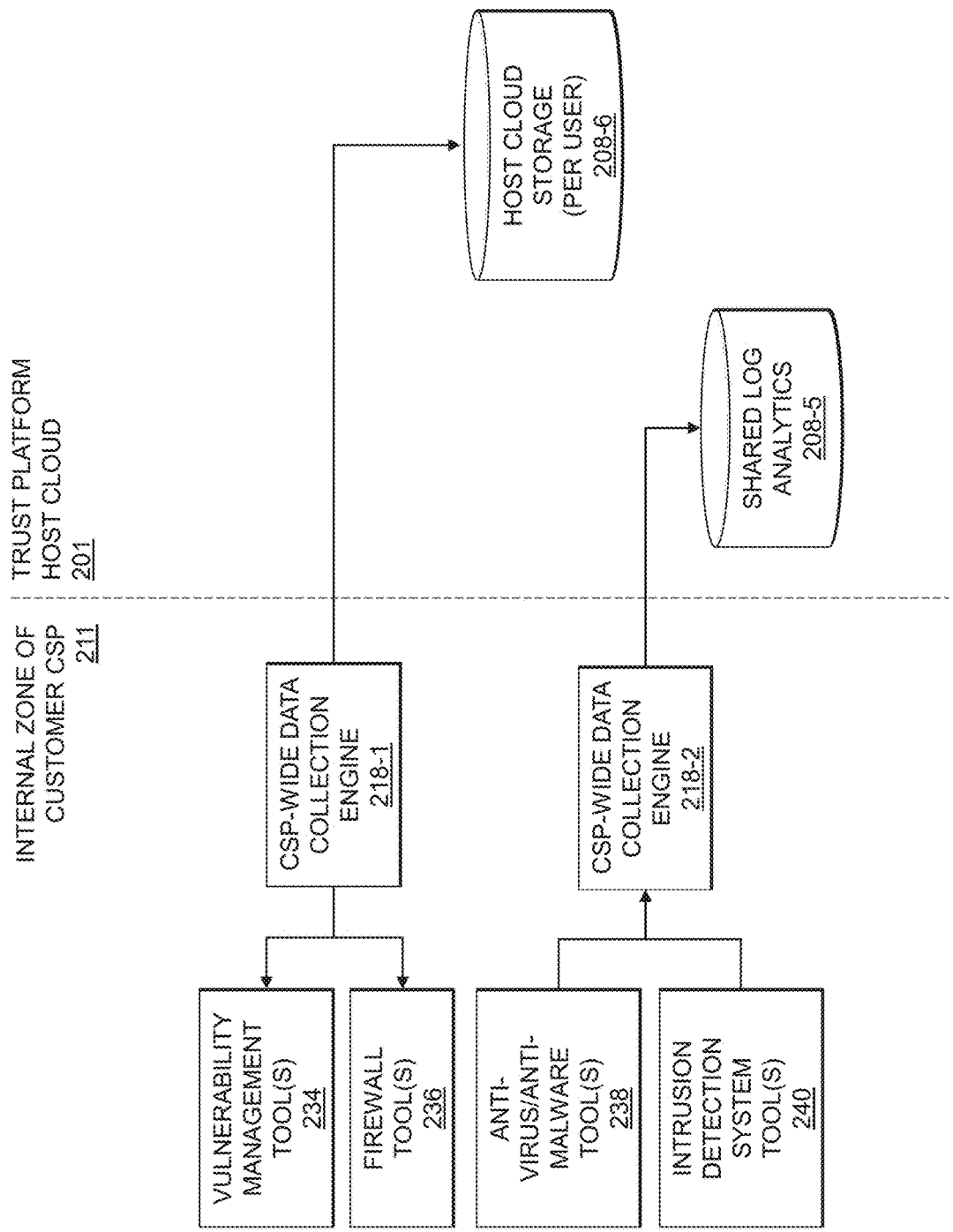

FIG. 2D illustrates further details of the internal zone 211 of the customer CSP, which pushes data to the shared log analytics store 208-5 and host cloud storage 208-6 via CSP-wide data collection engines 218. In FIG. 2D, the CSP-wide data collection engines 218 include a first CSP-wide data collection engine 218-1 and a second CSP-wide data collection engine 218-2. The first CSP-wide data collection engine 218-1 obtains data from one or more vulnerability management tools 234 (e.g., Tenable® SC) and one or more firewall tools 236 (e.g., Algosec®) and stores such data in the host cloud storage 208-6. The second CSP-wide data collection engine 218-2 obtains data from one or more anti-virus/anti-malware tools 238 and one or more IDS tools 240 and stores such data in the shared log analytics store 208-5.

Whereas the customer zone 207 provides user or customer-specific data to the trust platform data store 108 (e.g., entitlement store 208-3, per-user log analytics store 208-4, host cloud storage 208-6), the internal zone 211 provides CSP-wide data to the trust platform data store 108 (e.g., shared log analytics store 208-5 and host cloud storage 208-6). Each customer may run their own cloud monitoring tools (e.g., as applications on cloud assets such as the VMs 220, on customer-installed tools that monitor a set of cloud assets such as IDS tools 222, anti-virus/anti-malware tools 224, customer SIEM tools 228, etc.) in the customer zone 207. The customer CSP itself, however, may also run various cloud monitoring tools that monitor the cloud assets of multiple users of the customer CSP. For example, multiple users may have cloud assets running on a Virtustream Enterprise Cloud, and the internal zone of the Virtustream Enterprise Cloud may run monitoring tools that collect data for the cloud assets of such multiple users.

The cloud monitoring tools in the customer zone 207 and the internal zone 211 may be provided by the same or different vendors. In some embodiments, the IDS tools 222 in the customer zone 207 may be provided by the same vendor as the IDS tools 240 in the internal zone 211. In other embodiments, the IDS tools 222 in the customer zone 207 may be provided by a different vendor than the IDS tools 240 in the internal zone 211. It should be noted that, even in embodiments where the same vendors provide the same type of cloud monitoring tools in both the customer zone 207 and the internal zone 211 of a customer CSP, such tools may be controlled and managed independent of one another.

It should be appreciated the customer zone 207 and internal zone 211 may represent portions of any one of the customer CSPs 205. Thus, each of the CSPs 110 that are part of the customer CSPs 205 may have an associated customer zone 207 and internal zone 211 which push data to the trust platform 102. This illustrates the complexity of managing cybersecurity services for users or customers with hybrid or multi-cloud workloads, as there may be numerous cloud monitoring tools on each of the CSPs 110 used by a particular user or customer, in addition to cloud monitoring tools that may run on the trust platform host cloud 201.

Deploying security services for managing workloads on CSPs 110 manually is time consuming, expensive, and prone to errors and inefficiencies. For example, a security services provider may offer some limited security services which are largely manual, and do not necessarily scale to keep up with an expanding portfolio of offerings. The lack of automation for deploying and managing security services becomes more critical as a security services provider expands to support security services for workloads on different CSPs (e.g., such as supporting security services for Azure workloads). Conventional approaches have no mechanism for providing customers with real-time or near real-time information about their security, compliance and risk posture for such multi-cloud workloads. Such information is either not available, or is sent out monthly or quarterly rather than in real-time or near real-time. In addition, end-users that run hybrid or multi-cloud workloads must manage and deploy different sets of tooling and security services across multiple platforms (e.g., multiple CSPs supporting the hybrid workloads) as illustrated in the architecture of FIGS. 2A-2D. End-users thus struggle to identify their security, compliance and business risks as a whole because conventional approaches do not provide a way to consolidate data across hybrid and multi-cloud workloads. Further, a la carte security services offerings may create gaps in security coverage, increasing security liability.

Managed security services may provide various functionality. Customers or other end-users may undergo rapid migration to cloud computing, and face various challenges such as a shortage of technical security staff, regulatory compliance requirements, the unrelenting evolution of threats, etc. Core services of a managed security system may include 24/7 security event monitoring, threat detection, vulnerability assessment, reporting and incident response, etc. Worldwide, managed security services continues to grow. Cloud security services, however, may be highly fragmented, ranging from cloud management platform vendors, telecommunications providers, cloud infrastructure providers, cyber security companies, managed security services providers, etc. Some managed security services provide extended detection and response (XDR) tools, machine learning (ML), and automation capability to improve security operations productivity and detection accuracy. A managed security services provider may have XDR capability and full API automation, designed for cloud first and zero trust solutions.

There is thus a need for timely visibility, as cyber attacks are growing both in volume and sophistication. The lack of timely visibility into vulnerabilities and intrusion attempts often leads to unintentional open and aging vulnerabilities, and may also curb the ability to respond to intrusion attempts before they become breaches. Data breaches may occur due to lack of visibility into security operations and programs. Complexity also presents issues, as some enterprises may deploy 50 or more different cybersecurity solutions and technologies. Procuring, architecting, deploying, configuring, and maintaining (e.g., keeping security up to date) such a complex ecosystem is not only overwhelming but also prone to configuration errors, maintenance delays, productivity loss, and gaps in security posture. The complexity is further increased when dealing with regulated and mission-critical workloads in the cloud. These and other issues are further complicated by skills shortages. Cybersecurity professional shortages continue to be an issue, leading to work overload on existing staff, inability to fully learn and utilize some cybersecurity technologies, and lack of alignment between cybersecurity and business. Further, the rising cost of security presents issues. Lack of cybersecurity talent, limited time, and a plethora of cybersecurity tools and solutions options lead to a lack of cybersecurity and business alignment, incorrect risk-cost prioritization and, in turn, raising costs.

The trust platform 102 advantageously provides actionable visibility, including a real-time or near real-time view into open vulnerabilities and intrusion attempts at one place to promote action at speed. Features such as top vulnerable assets, top vulnerabilities, vulnerability aging, and intrusion alerts enable better security posture by helping prioritize prevention and response actions. The trust platform 102 can also simplify security across multiple clouds with mission-critical expertise. Pre-validated and preconfigured security bundles (e.g., for different CSPs 110) enable end-users to choose options based on their desired security posture without facing the complexity of dealing with multiple vendors, training existing staff, or selecting, procuring, architecting, deploying and maintaining a complex security ecosystem manually. As will be described in further detail below, bundles of managed security services may include preselected services and security tools with licensing subscription, setup, and managed services for ongoing operations and maintenance. The trust platform 102 may therefore be used to improve productivity and reduce skills gaps, through offloading cloud security management to reduce security operations burdens on in-house staff, and leveraging included professional services hours (e.g., for advisory, security posture assessment, infection/vulnerability remediation, pre-audit advisory, etc.) in areas where end-users lack in-house skills. The functionality of the trust platform 102 may be offered in accordance with a subscription model that enables end-users to scale their cloud security operations on-demand as their cloud footprint grows. Multiple options for bundled security services of the trust platform 102 also enable end-users to choose between different security postures to balance the cost of security against risk based on application and data sensitivity, criticality to operation of the business, etc.

Advantageously, managed security services may provide benefits in replacing or integrating a customer or end user's existing tools, offering options for aggregating such tools into one place at different levels (e.g., operational, compliance, governance). Managed security services may thus provide significant value, though there may be risks associated with external dependencies and tool efficacy. A managed security services provider may provide "one hand to shake"—a full stack, integrated offering that provides point and click automation for the end-user for various features, including but not limited to one or more of: SaaS offerings; multi-cloud support and enablement; consolidated near real-time dashboard of security and compliance tools; security and compliance tool provisioning and automation; incident response, ability to take action and address control gaps (e.g., preventing and/or minimizing impact); a range of support for third-party security and compliance products; entitlement and fulfillment information; compliance and privacy; vulnerability management; security risk management; identity and access management; etc.

The "one hand to shake" simplicity of managed security services allows a managed security services provider to manage cloud workloads and deliver security services for end-users. In some cases, preconfigured managed security services packages may be offered to meet common security and compliance needs of end-users, and thus end-users are not required to make complex choices. Policy, cost and control tracking may be further simplified using a dashboard GUI (e.g., the trust platform GUI 112 of trust platform 102). Security operations (SecOps) team productivity may be increased using managed security services, through offloading security management for cloud-hosted mission-critical applications. Managed security services can further enable consistent security policies with centralized policy management, and can facilitate automated deployment of security services across various securities solutions and clouds. Managed security services may also serve to rationalize and control security services costs for end-users, with centralized visibility into all purchased security services. Proactive management of security risks may be provided through a real-time or near real-time, contextual view across vulnerabilities and intrusion attempts allowing end-users to act before attacks become breaches.

In some embodiments, a managed security services solution provided using the trust platform 102 provides one dashboard (e.g., via trust platform GUI 112) to track identity and access management (IAM) policies and lifecycle management, intrusion attempts, security services, vulnerabilities, compliance, risk management, etc. The dashboard may also enable tracking of security and compliance across multiple clouds. The trust platform 102 may also represent a provider of both cloud management and cloud security services. The use of managed security services can also improve time to cloud security by reducing security deployment times with pre-configured packages, and can address staff shortage and cloud security knowledge gaps by offloading security management to the trust platform 102. Through automated deployment of security services across various securities solutions and clouds, the trust platform 102 can enable compliance for regulated, mission-critical data and applications. Further, the trust platform 102 may facilitate delivery of included professional services of security engineers that work directly with end-users.

The trust platform 102, via the trust platform GUI 112, may provide various interfaces for: log management trend analysis; cybersecurity management, including but not limited to management of firewalls, anti-virus, anti-malware, intrusion detection and prevention, etc.; searching, monitoring and analyzing "big data"; identity and access management; compliance services; viewing security alerts; viewing intrusion attempts; etc. The trust platform 102 may also provide functionality for enabling custom-defined (e.g., customer or end-user defined) identity and access management policies, providing end-user visibility into purchased services, showing vulnerabilities, scanning for vulnerabilities, etc. The trust platform 102 may further include functionality for controlling the costs for security services, for defining and viewing key performance indicators (KPIs), for managing security and compliance risk, for identifying assets that are missing entitlements and identifying actions to resolve such issues, etc.

In some embodiments, the trust platform 102 meets various challenges of managed security services systems by providing a "single pane of glass" through the trust platform GUI 112 that brings together security, compliance and business risk across multi-cloud workloads (e.g., workloads running on the CSPs 110). The trust platform 102 provides an interface through the trust platform GUI 112 that enhances security services by bringing both visibility and actionability to the information collected. This interface may include: a combined real-time or near real-time view of security, compliance and business risk posture across all of an end-user's digital or cloud assets; functionality for managing security and compliance service tools across platforms (e.g., across different ones of the CSPs 110); automated development and management of security services across multi-cloud workloads (e.g., a workload that runs on multiple ones of the CSPs 110). The trust platform 102 interface may be targeted to various end-users, and may provide significant benefits particularly for end-users that run hybrid workloads or end-users that are migrating workloads to the cloud. As will be described in further detail below, the trust platform 102 may offer services in different tiers.

Security services provided by the trust platform 102 may include IAM, a security operations health dashboard, entitlement and fulfillment information, vulnerability management, compliance and privacy, security risk management, etc. IAM may leverage zero trust identity security, and enable customer IAM policies and lifecycle processes. The security operations health dashboard provides full visibility and transparency into security alerts, intrusion attempts for end-user workloads, etc. The entitlement and fulfillment information includes visibility into purchased services, control of costs for security services, identification of assets that are missing entitlements along with actions to resolve such issues, key performance indicators (KPIs), etc. Vulnerability management enables increased visibility for vulnerabilities, scanning for security vulnerabilities, etc. Compliance and privacy may include health information trust (HITRUST), system and organization controls (SOC) compliance services, etc. Security risk management enables management of security and compliance risks. The security services of the trust platform 102 may provide better visibility into trust services, reducing or eliminating gaps around IAM for entities utilizing cloud services.

The trust platform 102 may be provided as a pillar of overall managed security services. The trust platform 102 may be implemented as a cloud agnostic software-as-a-service (SaaS) tool that provides real-time or near real-time actionable business cyber security threat, risk and compliance information for digital assets and workloads, regardless of the cloud provider and technology used. The trust platform 102 in some embodiments will integrate natively and complement managed security services and professional services. This improves security and compliance posture for end-users, allowing the end-users to focus on the big picture and make informed decisions with the "single pane of glass" visibility across security and compliance (e.g., to ensure that the end-user has an acceptable risk posture, to identify and close security gaps, to optimize the cost of security and compliance, etc.). Simplified, consistent security operations provide gains in efficiency. Security operations are simplified while ensuring operational efficiency and consistency through: unified management of disparate security and compliance tools across platforms; automated deployment of security services across multiple clouds; ensuring consistent implementation of security policies with centralized policy management; a SaaS solution that means faster time to security with no upfront capital expenses; etc. The trust platform 102 also allows users to take control, and act before bad actors can harm cloud assets using the real-time or near real-time contextual view across vulnerabilities and intrusion attempts. This allows users to rationalize and control security services with centralized visibility into all security services.

Defense tactics for workloads and assets operating in CSPs 110 may include preventing, securing, monitoring and responding to threats. The lifecycle may include security, compliance, privacy and transparency stages. Security includes access control (multi-factor authentication, least privilege model role-based authorization), physical security (24×7×365 control using biometrics and authorized access to physical data centers, closed captioning television (CCTV) monitoring and security guards), etc. Compliance and privacy includes perimeter security (e.g., firewall, network IDS (NIDS), network IPS (NIPS), penetration testing), network security (NIDS, NIPS, vulnerability scanning, network segregation, network segmentation), host security (host firewall, host IDS (HIDS), anti-malware, anti-virus, file integrity monitoring (FIM), OS patch management, vulnerability scanning), application and data security (transparent data encryption, vulnerability scanning, patch management, virus and malware scanning), etc. Transparency includes monitoring and reporting (security information and event management (SIEM), security intelligence and operations, log management, alerting, incident handling, eyes on glass), culture (awareness, policies, procedures, guidelines, training, prioritization), etc.

The trust platform 102 may provide a fast-track to proactive security for cloud workloads, which may operate in multiple stages including an identify stage, a deploy stage, a go-live stage and an operate stage. In the identify stage, all assets are inventoried and deployment is planned. Deployment planning may include alignment to change control policies. During the deploy stage, tools and monitoring agents are deployed on the CSPs 110, which may include customized configurations (e.g., in accordance with end-user specified policies). The deployment is also validated prior to the go-live stage, which enables real-time or near real-time visibility. In the operate stage, full lifecycle management is provided, along with on-demand support where professional services are leveraged.

The trust platform 102, in some embodiments, provides a bundled set of managed security services for end-users (e.g., of client devices 104) for managing, among other tasks, security and compliance for cloud services of CSPs 110 utilized by the end-users. For example, the trust platform 102 may offer pre-selected bundles of managed security services (e.g., xStreamCare Services® for a Virtustream Trust Platform), possibly in conjunction with professional service hours to be delivered by cloud security experts of the trust platform 102. The trust platform 102, via its security operations health dashboard (e.g., provided via the trust platform GUI 112), enables real-time or near real-time visibility and transparency into: security alerts, intrusion attempts for end-user workloads, logs, user management, etc. A wide variety of bundled sets of managed security services may be offered by the trust platform 102.

Figure 3:
FIG. 3 shows a table of bundles of managed security services offered by a trust platform in an illustrative embodiment.

FIG. 3 shows a table 300 illustrating examples of different tiers of bundled managed security services, including an "Essentials" tier, an "Enhanced" tier, a "Healthcare" tier, and a "Premium" tier. Each of these tiers includes subscriptions to various services and a set of professional services hours. The Essentials tier, for example, offers an anti-virus/anti-malware primary system, host intrusion detection, host firewall, host file integrity monitoring, log management, and vulnerability scanning. The Enhanced tier includes the subscriptions of the Essentials tier, plus log forwarding, network intrusion detection, a firewall auditor, data-at-rest encryption, file scanning (e.g., such as SAP file scanning), system and organization controls (SOC) compliance, and operating system (OS) hardening validation. The Healthcare tier also includes the subscriptions of the Essentials tier, along with log forwarding, network intrusion detection, a firewall auditor, data-at-rest encryption, SOC 2 and health information trust (HITRUST) attestation, and OS hardening validation. The Premium tier includes the subscriptions of the enhanced tier, plus an operating model with minimum end-user responsibility for trust services, a web application firewall, session recording of all OS interactive logins (e.g., comprehensive auditing), data loss prevention, OS hardening, software blacklisting, a secure web gateway, encryption key management, and HITRUST compliance for healthcare end-users. The Essentials tier includes 8 professional services hours per month, while the Enhanced and Healthcare tiers include 20 professional services hours per month and the Premium tier includes 80 professional services hours per month.

It should be appreciated that the table 300 of FIG. 3 shows only four possible examples of tiers of bundled managed security services. In other embodiments, more or fewer tiers of bundled managed security services may be utilized. Further, the particular subscriptions included within different tiers of the bundled managed security services may vary as desired for a particular implementation. Additional tiers may include any desired combination of the subscriptions used in the example tiers of FIG. 3, possibly in combination with other possible subscriptions for managed security services. Similarly, the particular number of professional services hours included within different tiers may vary as desired, including tiers that do not include any professional services hours (or which do not provide professional services hours on a monthly basis).

The managed security services bundles include deployment of security controls at network, host/VM, OS, data and application levels. The holistic managed security services bundles enable robust protection using a defense-in-depth approach to security. Details of how various services contribute to a holistic security approach are as follows. Anti-virus and anti-malware protects hosts against zero-day attacks, ransomware, malware, viruses, Trojans, etc. Host intrusion detection/prevention and firewalls protect hosts against insider threats, zero-day attacks, denial of service, SQL injection, and cross-scripting (X-scripting). File integrity monitoring also protects hosts against insider threats, zero-day attacks, denial of service, SQL injection, and X-scripting. Vulnerability scanning protects hosts and the network against privilege escalation, SQL injection and X-scripting. Log management protects the OS, hosts and networks against all types of threats, and analyzes OS and security logs for anomalies-based threat detection. Data-at-rest encryption protects data against data theft. Network intrusion detection protects networks against zero-day attacks, brute force attacks, and known attack signatures. Firewall policy auditing protects networks by finding configuration errors and gaps to avoid brute force and known attacks. Log forwarding protects the OS, hosts and networks by forwarding aggregated OS and security logs for integration with analytics systems. OS hardening scans protect the OS by hardening as per CIS Level standards. File scanning protects applications against viruses and malware.

Further details regarding the trust platform GUI 112 of the trust platform 102 will now be described. The trust platform GUI 112 may provide various dashboard views or interfaces that enable a user to manage cloud assets across CSPs 110. Such dashboard views include, but are not limited to, views for alerts (e.g., generated by or relating to cloud assets), vulnerabilities (e.g., encountered on cloud assets), log analytics (e.g., event log management that collects system events host logs and lists operational statistics for a host), policy (e.g., summarized system-level policies that allow end-users to manage their own tenant-space policy, with or without operational support), firewall audit reports (e.g., showing scans of firewalls and summarizations of rule sets and configurations, along with benchmarking the data according to specific standards such as International Organization for Standardization (ISO) and Payment Card Industry (PCI) standards), compliance reporting (e.g., providing a summary or view of current status of customer compliance against certain standards, including an aggregation of information from different security tools), asset management (e.g., providing a current snapshot of assets in the tenant space, such as type, host name, IP, OS version, etc.), user management (e.g., sets up users and their access to the trust platform 102, provides end-user onboarding to the trust platform 102), and cloud service configuration (e.g., enabling end-users to register and set up CSPs 110 with the trust platform 102).

Log management and analytics views of the trust platform GUI 112 of the trust platform 102, for example, may give end-users the power and flexibility to perform ad-hoc queries against the logs collected for security and compliance, as well as the capability to export filtered or full data for archiving, analysis and reporting purposes. User management views of the trust platform GUI 112 of the trust platform 102 provide an entitlements management interface for the trust platform 102. Asset management views of the trust platform GUI 112 of the trust platform 102 catalog all tenant assets with key information and the status of security services. Compliance reporting views of the trust platform GUI 112 of the trust platform 102 offer one place to download the latest compliance reports, and may support various standards such as Type 2 SOC 2 and HITRUST with Cloud Security Alliance (CSA) Cloud Controls Matrix, Type 2 Attestation (AT-C 105 and AT-C 205) HIPAA/HITECH. Firewall auditing views of the trust platform GUI 112 of the trust platform 102 deliver downloadable network firewall audit reports detailing firewall rules and redundancies.

Various dashboard views of the trust platform GUI 112 will now be described with respect to FIGS. 4A-12. The trust platform GUI 112 may include a dashboard selection pane (as shown in FIGS. 4A, 5A and 6-12) which comprises interface features (e.g., links or buttons) for selecting a particular dashboard view to view. It should be appreciated that the dashboard views shown in FIGS. 4A-12 are present by way of example only, and that embodiments are not limited solely to use with the specific example dashboard views shown. Further, the particular plots, charts, tables and interface features shown and described with respect to FIGS. 4A-12 may be varied in other embodiments.

Figure 4A:
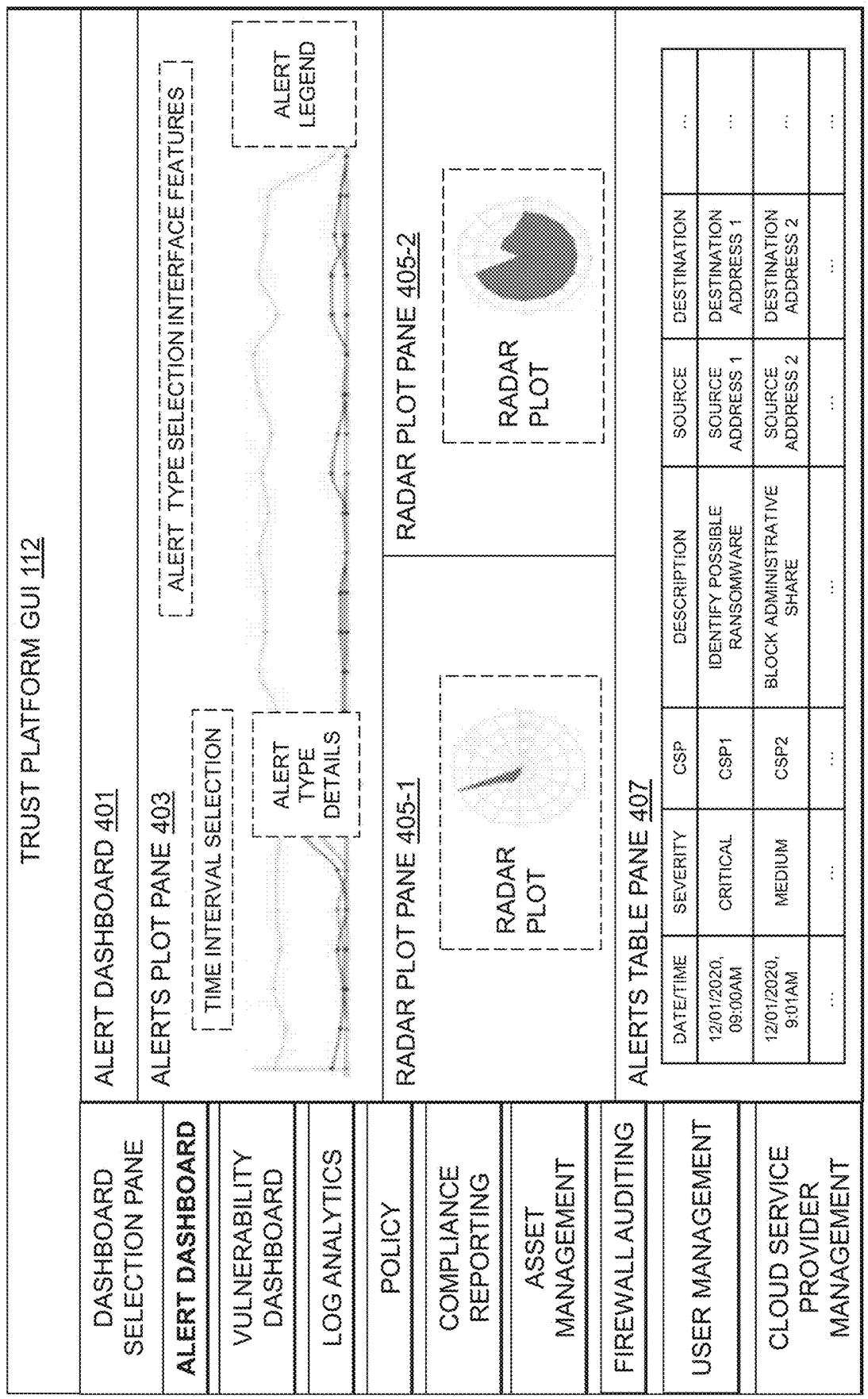
Figure 4B:
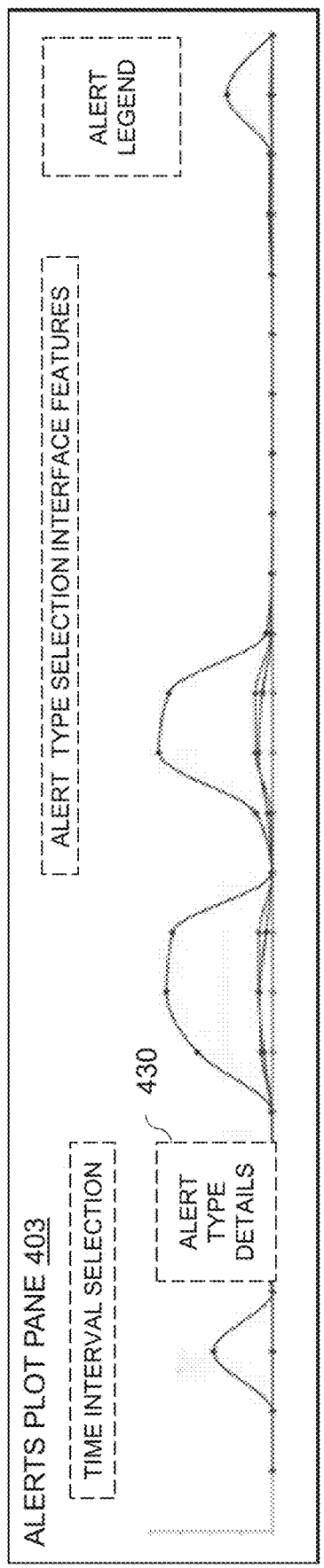
Figure 4C:
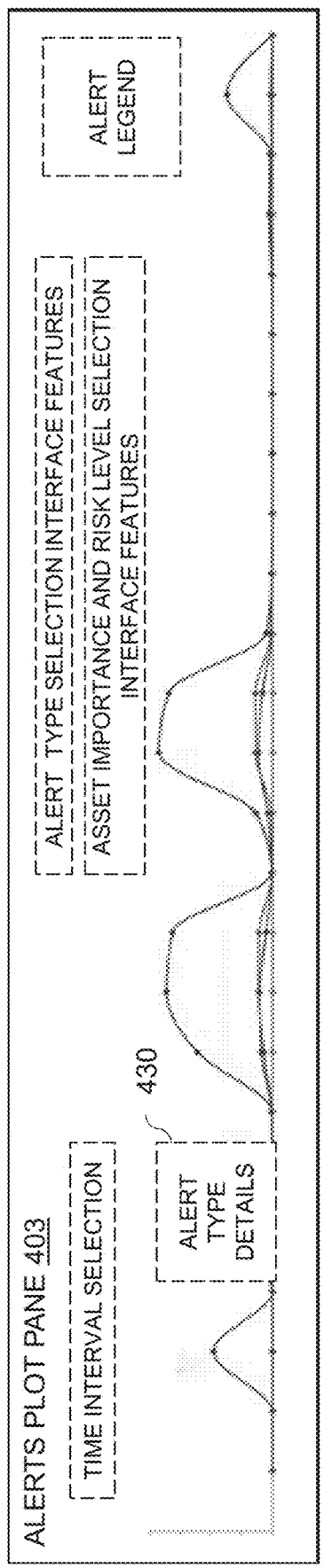

FIG. 4A shows an alert dashboard 401 which may be presented utilizing the trust platform GUI 112 of the trust platform 102. The alert dashboard 401 may be used to view alerts for anti-virus, anti-malware, host and network intrusion detection and prevention systems, file integrity monitoring, host firewall, etc. The alert dashboard 401 may also be used for exporting filtered or full data for archiving, external reporting, etc. End-users can filter by type of alerts, security levels, source, destination, time period, etc. The alert dashboard 401 in the FIG. 4A example shows a dashboard view pane 403 of an alerts plot for installed systems, which permits an end-user to choose the time period and the interval for display of the plot. The Y-axis of the dashboard view pane 403 shows the number of alerts in one or more selected categories. In the FIG. 4A example, the categories include: high, critical, host anti-malware, host intrusion protection system (IPS), network IPS, host file integrity monitoring (FIM), host firewall (FW), and all. It should be noted that some of the categories may require admin credentials to view (e.g., such as the host anti-malware alert category). The X-axis shows the time of the alert based on the selected time period and interval. For the FIG. 4A example, the selected time period is the last 24 hours and the interval is 1 hour. As shown in the view of FIG. 4B, the alerts plot pane 403 may display additional information 430 when a mouse hovers over or otherwise selects part of the plot. The additional information 430 may include, for a particular portion of a time interval (e.g., 8:00

AM), the numbers of different types of alerts. As shown in the view of FIG. 4B, the alerts plot pane 403 may be further configured with selectable user interface features that enable an end-user to filter the plot based on cloud asset importance, cloud asset risk, combinations thereof, etc. Selection of such interface features based on cloud asset importance and/or risk, in addition to updating the plot displayed in the alerts plot pane 403, may further update other portions of the alert dashboard 401 (e.g., radar chart plot panes 405-1 and 405-2, alerts table pane 407, etc.).

The alert dashboard 401 of FIG. 4A also includes radar chart plot panes 405-1 and 405-2 (collectively, radar chart plot panes 405) for source IP addresses and destination IP addresses, and an alerts table pane 407. The radar chart plot panes 405 show the type of attacks and the object of the attacks. For example, the source IP address radar chart plot pane 405-1 may provide information as to whether a particular period of abnormal activity represents a single attacker, multiple attackers, etc. Similarly, the destination IP address radar chart plot pane 405-2 may indicate if a particular period of abnormal activity represents an attack on a specific asset, multiple assets, etc. The radar chart plot panes 405-1 and 405-2 may also indicate benign activity, such as a vulnerability scan from one source IP address that accesses many destination IP addresses. Such detail may be drilled down by viewing the alerts table pane 407, showing the details of the alerts (e.g., date/time, severity level, CSP, description, source IP address, destination IP address, site, sensor, action, details, etc.), grouped according to severity level.

FIG. 4D shows a detailed view of the alerts table pane 407, which includes additional columns for affected assets, affected assets importance, and affected assets risk. Each alert, for example, may be associated with one or more affected cloud assets. The affected assets column may include lists of the cloud assets that are affected by a given alert. The affected assets importance column includes asset importance values for each of the affected assets for a given alert, and the affected assets risk column includes asset risk values for each of the affected assets for a given alert. As discussed above with respect to FIG. 4C, the alert plots pane 403 may include user interface features for selecting based on asset risk and/or importance, which would dynamically update the display of the alerts table pane 407. This may be used to highlight, for example, alerts that are associated with cloud assets having some designated threshold multi-cloud relative risk ranking. The designated threshold may correspond to one of a set of multi-cloud relative risk levels (e.g., high, medium, low, etc.), some specific numerical or percentage ranking (e.g., the top X number of cloud assets with the highest multi-cloud relative risk, or the top Y % of cloud assets ranked according to multi-cloud relative risk, etc.). Similarly, the alerts table pane 407 may include interface features for selecting or sorting based on affected assets, affected assets importance, and/or affected assets risk, which would dynamically update other portions of the alerts dashboard 401 such as the alerts plot pane 403 and radar chart plot panes 405.

FIG. 5A shows a vulnerability dashboard 501 which may be presented utilizing the trust platform GUI 112 of the trust platform 102. The vulnerability dashboard 501 may be used to bring awareness of open and aging vulnerabilities. This allows a user to prioritize remediation so as to view vulnerabilities in or out of defined policy, top vulnerable assets, top vulnerabilities, issue details, etc. The vulnerability dashboard 501 may also be used for exporting filtered or full data for archiving or external reporting. End-users may use the vulnerability dashboard 501 to define vulnerability remediation timelines, and views can change dynamically based on end-user remediation policies. The vulnerability dashboard 501 includes an aging report pane 503, showing statistics per tenant and a historical record of how long ago vulnerabilities were detected.

Figure 5B:
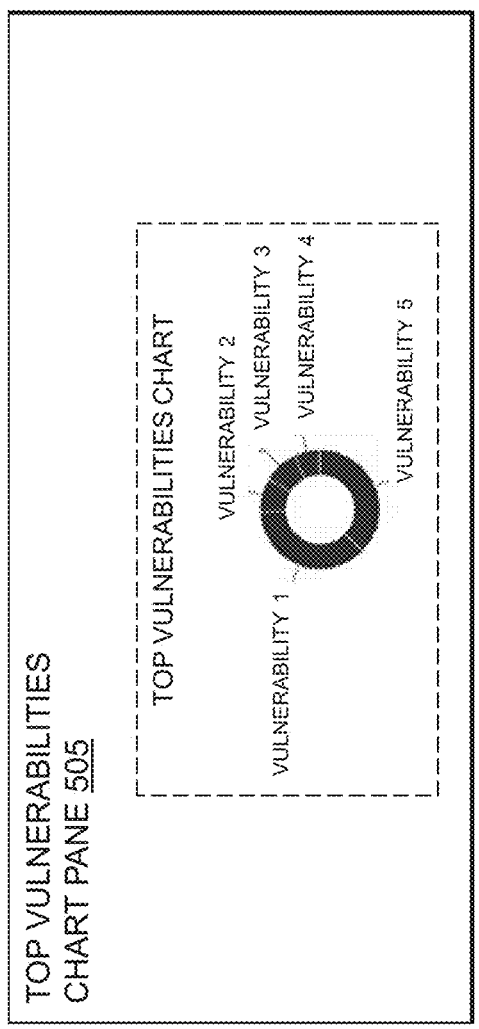

The vulnerability dashboard 501 also includes a top vulnerability chart pane 505, which includes a listing of the highest risk vulnerabilities that have been detected, including options for showing the top vulnerable assets and the top vulnerabilities. In the FIG. 5A example, the top vulnerable assets option is selected for the top vulnerabilities chart pane 505, which shows the scoring and ranking of vulnerabilities for any virtual device, including a listing of the top vulnerabilities by host according to a scoring system (e.g., the Common Vulnerability Scoring System (CVSS)). FIG. 5B shows an example where the top vulnerabilities option is selected for the top vulnerabilities chart pane 505, showing a scoring and ranking of the top vulnerabilities according to a scoring system (e.g., CVSS). The top vulnerability chart pane 505 helps the end-user to prioritize responses and resources according to threat.

In some embodiments, one or both of the aging report pane 503 and the top vulnerabilities chart pane 505 may take into account information regarding multi-cloud relative risk rankings (e.g., so as to "highlight" vulnerabilities that are associated with cloud assets having some designated threshold multi-cloud relative risk ranking in a manner similar to that described above with respect to highlighting alerts based on multi-cloud relative risk ranking).

The vulnerability dashboard 501 further includes a vulnerabilities table pane 507, which provides more details on vulnerabilities with the ability to break up data and drill down into the information. The vulnerabilities table pane 507 in the FIG. 5A example includes information related to scan data, asset name, IP address, a Network Basic Input/Output System (NETBIOS) name, severity, OS, plugin name, etc. FIG. 5C shows another view of the vulnerabilities table pane 507, which includes additional columns for asset importance and asset risk which display asset importance and asset risk values for respective ones of the cloud assets.

In some cases, the alert dashboard 401 and vulnerability dashboard 501 may be used in conjunction with one another. For example, a user may review alerts from the alerts dashboard 401, and determine suspicious activity for a particular IP address. That IP address may then be looked up by filtering the vulnerabilities table pane 507 based on that IP address to determine what vulnerabilities are present on the asset corresponding to the IP address.

FIG. 6 shows a view of a log analytics dashboard 601 of the trust platform GUI 112 of the trust platform 102. More specifically, the log analytics dashboard 601 shows a log search pane 603 where a log search query may be entered, and a pane 605 where results of the log search query are presented. The pane 605 may be further filtered based on any of a set of log attributes (e.g., computer name, event time, facility, host IP address, hostname, process ID, process name, security level, source system, syslog message, tenant ID, time generated, type, etc.). The results in pane 605 may be downloaded as desired. Similarly, alerts and vulnerabilities charts and views in the alerts dashboard 401 and vulnerabilities dashboard 501 may be downloaded as desired.

FIG. 7A shows a view of a policy dashboard 701 of the trust platform GUI 112 of the trust platform 102. More specifically, FIG. 7A shows the policy dashboard 701 where pane 703-1 includes policy settings for vulnerability management. Policy settings may also be selected for log management, as illustrated by the pane 703-2 shown in FIG. 7B. In the FIG. 7A example, the policy settings in pane 703-1 include configurable remediation timelines for different types of vulnerabilities (e.g., critical, medium, high low). Such settings will affect the vulnerability aging reports shown in the aging report pane 503 of the vulnerability dashboard 501. In the FIG. 7B example, the policy settings in pane 703-2 include configurable log forwarding addresses.

It should be noted that FIGS. 7A and 7B show just two examples of policy settings that may be managed using the policy dashboard 701. In other embodiments, the policy dashboard 701 may include interface features for selecting various other "tabs" or views of policy settings for controlling various other aspects of cloud assets on the CSPs 110. For example, the policy dashboard 701 may include a tab or other page or view that permits selection of policy settings for alerts (e.g., thresholds for triggering alerts, classification of alerts into different alerts categories such as low, medium, high, critical, etc.), access keys or other credential management (e.g., the types of users and number of users that may be granted ephemeral just in time access credentials for cloud assets of the CSPs 110). Policy settings may also be used for generation of security and compliance controls for monitoring tools deployed on the CSPs 110, in addition to security and compliance controls for cloud assets themselves. Such policy settings may relate to perimeter security (e.g., firewall, network IDS (NIDS), network IPS (NIPS), penetration testing), network security (NIDS, NIPS, vulnerability scanning, network segregation, network segmentation), host security (host firewall, host IDS (HIDS), anti-malware, anti-virus, file integrity monitoring (FIM), OS patch management, vulnerability scanning), application and data security (transparent data encryption, vulnerability scanning, patch management, virus and malware scanning), monitoring and reporting (security information and event management (SIEM), security intelligence and operations, log management, alerting, incident handling, eyes on glass), culture (awareness, policies, procedures, guidelines, training, prioritization), etc.

FIG. 8 shows a view of a compliance dashboard 801 of the trust platform GUI 112 of the trust platform 102. The compliance dashboard 801 includes a pane 803 with a list of compliance reports which may be viewed or downloaded as desired. In some embodiments, the trust platform 102 may maintain compliance reports for a user-configurable period of time, for use in auditing and meeting any needed regulatory or other requirements.

FIG. 9A shows a view of an asset management dashboard 901 of the trust platform GUI 112 of the trust platform 102. The asset management dashboard 901 includes a pane 903 listing the various cloud assets (e.g., VMs, containers, etc.) that an end-user is running across the various CSPs 110. The cloud asset listing pane 903 includes columns indicating whether an asset is powered on, its associated CSP, the asset type (e.g., VM, container, etc.), asset name, hostname, IP address, OS, whether that asset has host security enabled, whether the asset has data-at-rest encryption enabled, etc. The asset management dashboard 901 may be filtered, such as to show all assets without host security or data-at-rest encryption enabled (or any other desired cloud asset attribute). This may be used to generate reports that may be downloaded by the user. The pane 903 also includes in the table a column of "actions" that includes user interface features (e.g., buttons, links, etc.) that enable a user to perform various actions with respect to the cloud assets, such as editing or deleting such cloud assets, as well as accessing such assets. Selection of the "access" action user interface feature for a particular cloud asset may bring up a dialog box enabling a user to auto-generate and remove ephemeral just-in-time access credentials (e.g., user accounts) on that cloud asset as described elsewhere herein.

FIGS. 9B and 9C show additional views of the cloud asset listing pane 903, where the cloud assets table includes various additional columns detailing asset importance and asset risk information. FIG. 9B, for example, shows a simplified view that includes only additional columns for asset importance and asset risk. FIG. 9C shows another example that includes additional detail, including additional columns for various asset importance and asset risk factors that contribute to asset importance and asset risk. One or more of the asset importance and asset risk factors may include user-defined or user-tagged values, while one or more other ones of the asset importance and asset risk factors may be determined through one or more automated discovery processes. It should be appreciated, however, that in some embodiments all of the asset importance and asset risk factors are user-defined, or that all of the asset importance and asset risk factors are determined through automated discovery processes. The asset risk, in some embodiments, may be based on at least in part on asset importance. Consider, as an example, asset risk factors that are in the form of extra metadata tagged to different cloud assets. Some asset risk factors may be determined based on automated discovery (e.g., whether the cloud asset utilizes or supports features such as active directory, a key vault, etc.). Another example of a risk factor is a tag for whether cloud assets have an external surface area (e.g., cloud assets that have an external surface area are attackable from the outside, and thus may be deemed riskier). Other asset risk factors may be user-defined (e.g., whether cloud assets have access to sensitive information, such as credit card or other financial information, etc.).

As noted above, FIGS. 9B and 9C illustrate possible views of the cloud asset listing pane 903 with simplified and expanded cloud asset tables. In some embodiments, the view of FIG. 9B is a default view, where the columns for the different asset importance and asset risk factors are "hidden." The view of FIG. 9B may include interface features that allow the user to expand or view such "hidden" columns, so as to transfer the view of FIG. 9B to the view of FIG. 9C. Further, although FIG. 9C shows a view with both the asset importance and asset risk factor columns expanded, a user may choose to expand just the asset importance factor columns or just the asset risk factor columns as desired.

As described above with respect to FIGS. 4C, 4D and 5C, the alerts dashboard 401 and vulnerabilities dashboard 501 may utilize information relating to asset importance and/or asset risk, so as to highlight alerts and/or vulnerabilities for assets having some designated threshold importance level or risk level. Further, it should be appreciated that asset importance and asset risk factors may be assigned at different granularities. For example, a cloud asset may include a network segment including a plurality of other cloud assets (e.g., software containers or VMs running in that network segment). Asset importance and asset risk factors may be assigned to a higher level cloud asset (e.g., a network segment) and then propagated or applied to lower level cloud assets within the higher level cloud asset (e.g., containers and VMs in the network segment). Asset importance and asset risk factors or overall values may also propagate upwards. For example, the asset importance or asset risk that is assigned to a higher level cloud asset (e.g., a network segment) may be based at least in part on the asset importance or asset risk values for lower level cloud assets (e.g., containers and VMs) contained within the higher level cloud asset (e.g., the network segment).

FIG. 10 shows a view of a firewall auditing dashboard 1001 of the trust platform GUI 112 of the trust platform 102. The firewall auditing dashboard 1001 includes a pane 1003 listing firewall audit reports that may be downloaded.

FIG. 11 shows a view of a user management dashboard 1101 of the trust platform GUI 112 of the trust platform 102, which includes a pane 1103 showing registered users, as well as interface features for adding, removing and editing registered users. The information in pane 1103 may be for a particular end-user enterprise, multiple end-user enterprises, etc.

FIG. 12 shows a view of a CSP management dashboard 1201 of the trust platform GUI 112 of the trust platform 102, which includes a pane 1203 showing registered CSPs, as well as interface features for adding, removing and editing registered CSPs. The information in pane 1203 may be for a particular end-user enterprise, multiple end-user enterprises, etc.

User setup in the trust platform 102 will now be described. The trust platform 102, or a provider thereof, may set up one account (e.g., for a particular customer or other entity), and the user of that account may set up one or more additional user accounts. For example, a business or other organization may have one master or administrator user account for the trust platform 102, and then the master or administrator user account is used to set up user accounts for individual units or divisions of the organization, or for particular users of the organization or units or divisions thereof. In some embodiments, one or more of the CSPs 110 may set up their own tenants or users as "customers" of the trust platform 102, enabling such tenants or users (possibly an administrator user for an entity with multiple end-users) to access the trust platform 102 to register user accounts (e.g., for various end-users of the entity that is a customer or tenant of a particular CSP). Each of the users may be required to download an authenticator application (e.g., Google Authenticator™) to sign on to the trust platform 102. The user setup process may then proceed as follows:

1. Once one of the CSPs 110 sets up a customer, that customer (e.g., a system administrator for an entity) accesses the trust platform 102 and selects User Management>Register User.
2. User information may then be completed for the user accounts, where the user information may include a valid email, first and last name, phone number, etc.
3. For each user account, a selection is made as to the features to make available to that user. For each feature (or possibly for groups of features), different types of access may be provided such as: "all" to give access to read, write and delete capabilities; "r" to give read capability; "w" to give write capability; "d" to give delete capability. Read, write and delete capabilities are independent of each other, and it is possible to select any one or two of read, write and delete capabilities for a particular feature (if all three are selected, this corresponds to the "all" access type). As noted above, the access types may be assigned on a per-feature basis of the trust platform 102. For example, different user accounts may be assigned different access types for features such as: the alert dashboard (e.g., 401 in FIG. 4A), the vulnerabilities dashboard (e.g., 501 in FIG. 5), compliance access management or other policy management (701 in FIGS. 7A and 7B), compliance reporting (e.g., 801 in FIG. 8), asset management (e.g., 901 in FIG. 9A), user management (e.g., 1101 in FIG. 11), cloud service configuration (e.g., 1201 in FIG. 12), log analytics (e.g., 601 in FIG. 6), firewall auditing (e.g., 1001 in FIG. 10), etc.
4. The user account is saved.
5. The trust platform 102 sends a message to the addressee of the new user account (e.g., to the valid email address completed in step 2) with a link to allow that user to complete the registration. The new user account may not be included in the list of Administration>User Management until the associated user completes the registration.

Once a user account is set up in the trust platform 102 (e.g., using the user setup process described above), the user may be prompted to complete registration (e.g., via a link included in an email message). The user may be required to install an authenticator application (e.g., Google Authenticator™) for sign-on to the trust platform 102. The authenticator application may be installed on a device of the user (e.g., the user's smartphone). If the user already has the authentication application, a new account may be created for use in accessing the trust platform 102. The user sign on process may then proceed as follows:

1. Download and install authenticator application.
2. Open message from the trust platform 102, and select link to open trust platform 102 sign up window, which prompts for user information.
3. Enter user email and password information for the user account. In some embodiments, the password requirements include that the password is at least 8 but no more than 30 characters, with at least one upper case letter, one lower case letter, one number and one special character. The password requirements, however, may vary as desired for a particular implementation.
4. With the authenticator application open (e.g., on the user's smartphone or other device), scan a displayed quick response (QR) code or other link to display a passcode.
5. Enter the displayed code in the appropriate passcode field.
6. The trust platform 102 then opens a sign up window.
7. Enter the user's email and password information set up in step 3 above, along with the passcode from the authenticator application.
8. Select sign on to open the trust platform 102's trust platform GUI 112.
9. On first sign on, the trust platform 102 may prompt the user to set up a CSP.

Once a user logs in to their account, the user may set up connections from the trust platform 102 to one or more CSPs 110. This may be a one-time setup (e.g., performed once for each of the CSPs 110 that the user seeks to link with the trust platform 102). The CSP setup process then proceeds as follows:

1. Access Administration>Cloud Service Configuration.
2. Select Add Provider.
3. A cloud management service (e.g., Virtustream xStream®) will show as the CSP, click Next.
4. The user logs in to the cloud management service, and follows the instructions for issuing a key pair. This may include issuing and activating a key pair from the cloud management interface's My Account page. This may include, in the header, selecting the Username to open the My Account page, clicking the "+" button to the right of the key pairs grid to issue a key pair, and, when the key pair appears in the grid activating it by clicking the gear icon in the Actions column and the clicking Activate to confirm, allowing the user to view the key pair by clicking on the private key.

5. Select a Region.
6. Enter the public and private keys of the key pair obtained from the cloud management service, and click validate.
7. The trust platform 102 validates the key pair and, if successful, displays "This key pair is valid."
8. The trust platform 102 prompts for the name of the CSP (e.g., to assign a user-defined name for the CSP).
9. Enter a name for the CSP.
10. The user can then onboard additional CSPs, or go to the alerts dashboard (e.g., 401 in FIG. 4A).
11. The user can then see all the information for their environment in the various reports and dashboards provided by the trust platform GUI 112 of the trust platform 102.

When end-users move mission-critical workloads to the cloud, the end-users may enhance a shared security model provided by the trust platform 102. The shared security model means that the trust platform 102 will deploy and operate security controls, including detection, prevention and response for the core network, physical storage, physical hosts and hypervisor. The end-users are traditionally responsible for the security of virtual hosts (e.g., virtual machines), OS, data and applications. Many end-users are challenged by the complexity of the cybersecurity ecosystem, the lack of actionable visibility, and the lack of cybersecurity skills and professionals to institute the right level of security for their workloads. The trust platform 102 can help the end-users overcome these challenges to achieve a proactive security posture to ensure security and compliance for workloads in the cloud. The bundled sets of security services may include security management and monitoring (e.g., 24×7×365 security management and alerting services aligned to workload and the data sensitivity or security posture that the end-user desires), access to the trust platform 102 (e.g., the trust platform GUI 112 providing the single pane of glass for real-time or near real-time visibility into security operations such as security alerts, intrusion attempts, logs, user management, etc.), and on-demand consulting (e.g., reserved consulting hours with certified security experts for ad-hoc needs such as cloud security advice, security posture assessment, infection and vulnerability remediation, limited pre-audit advice, etc.).

Additional security services may include a managed network firewall service, a managed web application firewall (WAF) service, and two-factor authentication (2FA). The managed firewall service includes installation and configuration of a firewall at the network level within the end-user's environment (e.g., perimeter firewall services at each data center location that has Internet-facing bandwidth). The managed WAF service includes installing, running, management and patching of a production-ready virtual WAF. The WAF protects mission-critical workloads and prevents web application attacks, such as manipulation of cookies or hidden fields, SQL injection attacks, exploitations of application memory buffers, unauthorized user access, layer 7 denial-of-service attacks, brute force attacks, web scraping attacks, etc. 2FA includes strong 2FA (e.g., using tokens as part of an infrastructure-as-a-service (IaaS) offering).

The managed security services bundles include deployment of security controls at network, host/VM, OS, data and application levels. The holistic managed security services bundles enable robust protection using a defense-in-depth approach to security. Details of how various services contribute to a holistic security approach are as follows. Antivirus and anti-malware tools and services protect hosts against zero-day attacks, ransomware, malware, viruses, Trojans, etc. Host intrusion detection/prevention and firewall tools and services protect hosts against insider threats, zero-day attacks, denial of service, SQL injection, and cross-scripting (X-scripting). File integrity monitoring tools and services also protect hosts against insider threats, zero-day attacks, denial of service, SQL injection, and X-scripting. Vulnerability scanning tools and services protect hosts and the network against privilege escalation, SQL injection and X-scripting. Log management tools and services protect the OS, hosts and networks against all types of threats, analyzes OS and security logs for anomalies-based threat detection. Data-at-rest encryption tools and services protect data against data theft. Network intrusion detection tools and services protect networks against zero-day attacks, brute force attacks, and known attack signatures. Firewall policy auditing tools and services protect networks by finding configuration errors and gaps to avoid brute force and known attacks. Log forwarding tools and services protect the OS, hosts and networks by forwarding aggregated OS and security logs for integration with analytics systems. OS hardening scanning tools and services protect the OS by hardening as per CIS Level standards. File scanning tools and services protect applications against viruses and malware.

Figure 13:
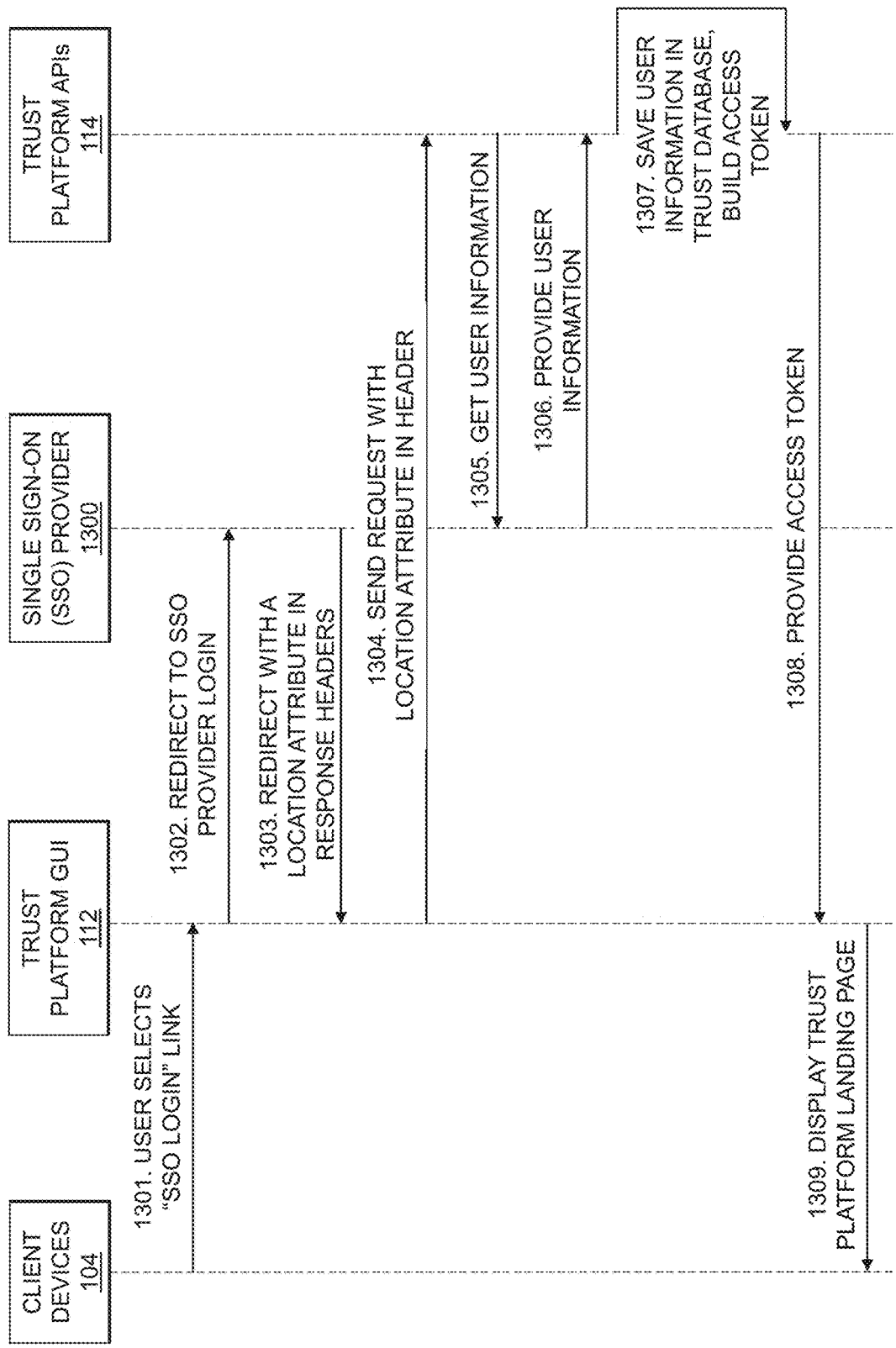
FIG. 13 shows a process flow for user login to a trust platform using a single sign-on provider in an illustrative embodiment.

FIG. 13 illustrates a process flow for a user of one of the client devices 104 to log in to the trust platform 102 using a Single Sign-On (SSO) provider 1300. The user may utilize a web browser to navigate to and select a link for SSO using the SSO provider 1300 in step 1301. The SSO provider 1300 may comprise a third-party SSO provider (e.g., Ping Identity Corporation). In some embodiments, the SSO provider 1300 utilizes Security Assertion Markup Language (SAML), and thus may be referred to as a SAML provider 1300. The trust platform GUI 112 in step 1302 redirects the request to the SSO provider 1300, along with user inputs (e.g., a user login name and password). The SSO provider 1300 provides back to the trust platform GUI 112 a redirect with a location attribute in the response headers in step 1303. The trust platform GUI 112 then sends a request with the received location attribute in the header to the trust platform APIs 114 in step 1304.

The trust platform APIs 114 send a request to obtain user information from the SSO provider 1300 in step 1305 (e.g., utilizing an access token), and the SSO provider 1300 provides the user information to the trust platform APIs 114 in step 1306. In step 1307, the trust platform APIs 114 save the user information in the trust platform data store 108, and build an access token for the user. The trust platform APIs 114 then provide the access token to the trust platform GUI 112 in step 1308. In some embodiments, the access token comprises a JavaScript Object Notation (JSON) Web Token (JWT) with a set of SAML assertions indicating the user's permissions for the trust platform 102 (e.g., the CSPs 110 or tenants or accounts thereof that the user can access information for). The trust platform GUI 112 in step 1309 redirects the browser of the user of the client device 104 to a landing page of the trust platform GUI 112.

Figure 14:
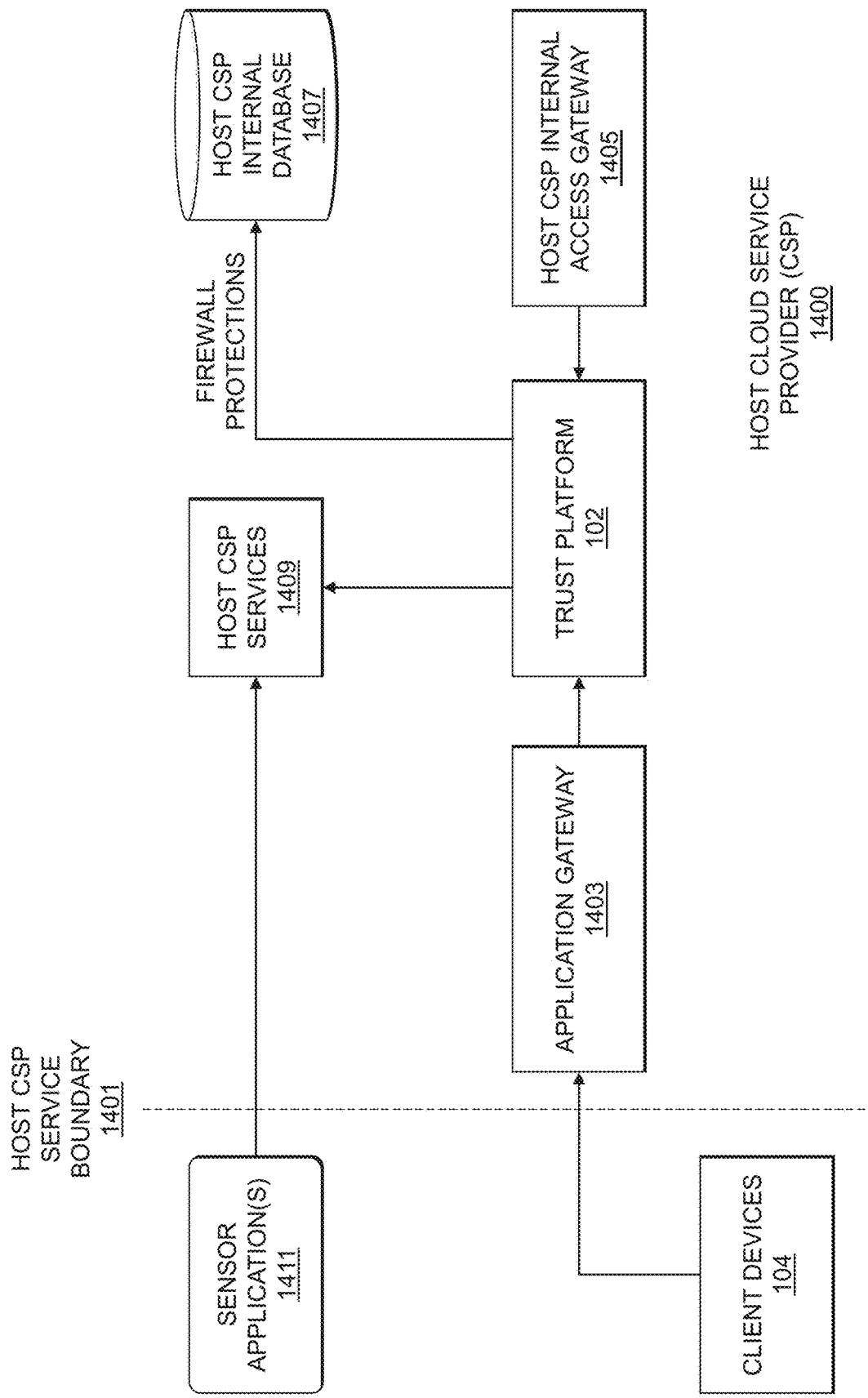
FIG. 14 shows access to a trust platform via gateways of a host cloud service provider in an illustrative embodiment.

FIG. 14 illustrates a logical deployment diagram for the trust platform 102 within a cloud service provider 1400, which may be one of the CSPs 110. In the FIG. 14 example, the trust platform 102 operating on an application subnet may be accessed in multiple ways. For external users outside of a CSP service boundary 1401 of the CSP 1400 running the trust platform 102, the trust platform 102 may be accessed over an application gateway subnet using application gateway 1403. The application gateway 1403 may provide load balancing and web application firewall (WAF) functionality. Thus, the external users via client devices 104 can access the trust platform 102 using the application gateway 1403. Internal users (e.g., operators of the trust platform 102) may access the trust platform 102 via an internal gateway 1405 of the CSP 1400 on which the trust platform 102 is implemented. The trust platform 102 may access a CSP internal database 1407 to obtain firewall protections for CSP services 1409 of the CSP 1400. The CSP services 1409 are accessed by external sensor applications 1411. More particularly, the CSP services 1409 are exposed using the firewall protections specified in the CSP internal database 1407.

If the CSP 1400 implementing the trust platform 102, for example, is Microsoft Azure, the CSP internal gateway 1405 may comprise an Azure Bastion gateway operating on a Bastion subnet, and the CSP internal database 1407 may comprise an Azure PostgreSQL database. The CSP services 1409 may include various Azure services, such as Vault, Cosmos, Storage, Log Analytics, etc. The external sensor applications 1411 can access Azure services via public APIs with the firewall protections.

Figure 15:
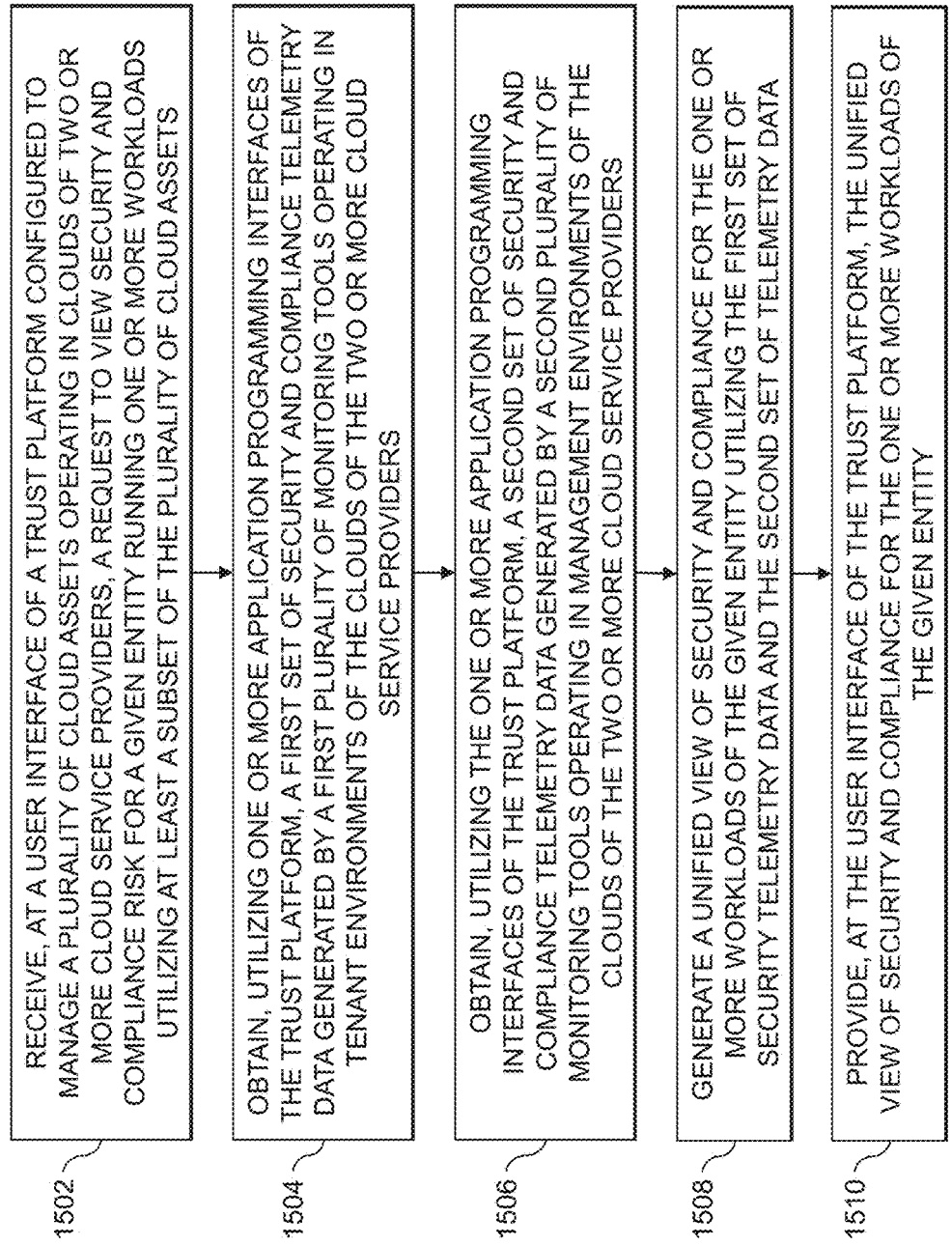
FIG. 15 is a flow diagram of an exemplary process for generating a unified view of security and compliance for multi-cloud workloads in an illustrative embodiment.

An exemplary process 1500 for generating a unified view of security and compliance for multi-cloud workloads will now be described in more detail with reference to the flow diagram of FIG. 15. It is to be understood that this particular process is only an example, and that additional or alternative processes for generating a unified view of security and compliance for multi-workloads may be used in other embodiments.

In this embodiment, the process 1500 includes steps 1502 through 1510. These steps are assumed to be performed by the trust platform 102 utilizing the trust platform GUI 112, the trust platform APIs 114 and the telemetry data management module 116. The process begins with step 1502, receiving, at the trust platform GUI 112 of the trust platform 102, a request to view security and compliance risk for a given entity. The trust platform 102 is configured to manage a plurality of cloud assets operating in clouds of multiple CSPs 110, where at least a subset of the plurality of cloud assets operating in the clouds of the multiple CSPs 110 run one or more workloads for the given entity.

In step 1504, the trust platform APIs 114 of the trust platform 102 are utilized to obtain a first set of security and compliance telemetry data generated by a first plurality of monitoring tools operating in tenant environments of the clouds of the CSPs 110. In step 1506, the trust platform APIs 114 of the trust platform 102 are utilized to obtain a second set of security and compliance telemetry data generated by a second plurality of monitoring tools operating in management environments of the clouds of the CSPs 110. A unified view of security and compliance for the one or more workloads of the given entity is generated in step 1508 utilizing the first set of security telemetry data obtained in step 1504 and the second set of telemetry data obtained in step 1506. The unified view of the security and compliance for the one or more workloads of the given entity is provided utilizing the trust platform GUI 112 of the trust platform 102 in step 1510.

The first plurality of monitoring tools are deployed by the given entity in the tenant environments of the clouds of the CSPs 110. The first plurality of monitoring tools comprise one or more SIEM tools, one or more IDS tools, and one or more anti-virus and anti-malware tools. The first plurality of monitoring tools provide security and compliance telemetry data for storage in a per-entity (or per-user) log analytics data store (e.g., 208-4), the per-entity log analytics data store comprising distinct workspaces associated with the given entity and one or more additional entities running one or more additional workloads on one or more additional subsets of the plurality of cloud assets operating in the clouds of the CSPs 110. In some embodiments, step 1504 includes determining an identifier of the given entity from a tenant database (e.g., 208-2) of the trust platform 102, obtaining credentials for the given entity from a key vault (e.g., 208-1) of the trust platform 102, selecting a given one of the workspaces in the per-entity log analytics data store that is associated with the given entity based at least in part on the determined identifier of the given entity, and accessing the first set of security and compliance telemetry data in the given workspace utilizing the obtained credentials for the given entity.

The second plurality of monitoring tools are deployed by the operators of the CSPs 110 in the management environments of the clouds of the CSPs 110 for monitoring the plurality of cloud assets utilized by the given entity and one or more additional entities. The second plurality of monitoring tools comprise one or more vulnerability management tools, one or more firewall tools, one or more anti-virus and anti-malware tools, and one or more IDS tools. The second plurality of monitoring tools provide security and compliance telemetry data for storage in a shared log analytics data store (e.g., 208-5), the shared log analytics data store comprising a combined workspace for security and compliance telemetry data generated across the clouds of the two or more cloud service providers. Step 1506 may include determining an identifier of the given entity from a tenant database (e.g., 208-2) of the trust platform 102, obtaining credentials for the given entity from a key vault (e.g., 208-1) of the trust platform 102, selecting, from the combined workspace of the shared log analytics data store, a given subset of the security and compliance telemetry data generated across the clouds of the CSPs 110 that is associated with the one or more workloads of the given entity running on the subset of the plurality of cloud assets operating in the clouds of the CSPs 110, and accessing the given subset of the security and compliance telemetry data from the combined workspace of the shared log analytics data store utilizing the obtained credentials for the given entity.

The unified view of security and compliance for the one or more workloads of the given entity may comprise an alert dashboard (e.g., 401). The alert dashboard comprises a first pane (e.g., 403) comprising a plot of alerts generated by the first plurality of monitoring tools and the second plurality of monitoring tools for the subset of the plurality of cloud assets operating in the clouds of the CSPs 110 on which the one or more workloads of the given entity run, wherein the first pane comprises a first set of user interface features for filtering the plot of the alerts by one or more alert attributes. The alert dashboard also comprises a second pane (e.g., 407) comprising a table of the alerts generated by the first plurality of monitoring tools and the second plurality of monitoring tools for the subset of the plurality of cloud assets operating in the clouds of the CSPs 110 on which the one or more workloads of the given entity run, wherein the second pane comprises a second set of user interface features for filtering the table of the alerts by one or more cloud asset attributes. The table of the alerts in the second pane is dynamically updated in response to filtering of the plot of alerts utilizing the first set of user interface features. The plot of the alerts in the first pane is dynamically updated in response to filtering of the table of the alerts utilizing the second set of user interface features.

The unified view of security and compliance for the one or more workloads of the given entity may also or alternatively comprise a vulnerability dashboard (e.g., 501). The vulnerability dashboard comprises a first pane (e.g., 503)

comprising a vulnerability aging report for vulnerabilities reported by the first plurality of monitoring tools and the second plurality of monitoring tools for the subset of the plurality of cloud assets operating in the clouds of the CSPs 110 on which the one or more workloads of the given entity run, wherein the first pane comprises a first set of user interface features for filtering the vulnerability aging report by one or more vulnerability attributes. The vulnerability dashboard also comprises a second pane (e.g., 507) comprising a table of the vulnerabilities reported by the first plurality of monitoring tools and the second plurality of monitoring tools for the subset of the plurality of cloud assets operating in the clouds of the CSPs 110 on which the one or more workloads of the given entity run, wherein the second pane comprises a second set of user interface features for filtering the table of the vulnerabilities by one or more cloud asset attributes. The table of the vulnerabilities in the second pane is dynamically updated in response to filtering of the vulnerability aging report utilizing the first set of user interface features. The vulnerability aging report in the first pane is dynamically updated in response to filtering of the table of the vulnerabilities utilizing the second set of user interface features.

The unified view of security and compliance for the one or more workloads of the given entity may further or alternatively comprise a log analytics dashboard (e.g., 601). The log analytics dashboard comprises a first pane (e.g., 603) comprising a first set of user interface features for submitting log search queries for logs generated by the subset of the plurality of cloud assets operating in the clouds of the CSPs 110 on which the one or more workloads of the given entity run. The log analytics dashboard may also comprise a second pane comprising a table of the logs, generated by the subset of the plurality of cloud assets operating in the clouds of the CSPs 110 on which the one or more workloads of the given entity run, that match the submitted log search queries, wherein the second pane comprises a second set of user interface features for filtering the table of the logs by one or more cloud asset attributes.

The unified view of security and compliance for the one or more workloads of the given entity may further or alternatively comprise an asset management dashboard (e.g., 901). The asset management dashboard comprises a pane (e.g., 903) comprising a table of the subset of the plurality of cloud assets operating in the clouds of the CSPs 110 on which the one or more workloads of the given entity run, the pane comprising a set of user interface features for filtering the table of the cloud assets by one or more cloud asset attributes. The one or more cloud asset attributes may comprise information indicating whether respective ones of the cloud assets have different security features enabled.

The unified view of security and compliance for the one or more workloads of the given entity may further or alternatively comprise one or more security and compliance report generation dashboards. The one or more security and compliance report generation dashboards may comprise a firewall auditing dashboard (e.g., 1001) comprising a pane (e.g., 1003) listing one or more firewall auditing reports for the subset of the plurality of cloud assets operating in the clouds of the two or more cloud service providers on which the one or more workloads of the given entity run, and one or more interface features for at least one of viewing and downloading respective ones of the one or more firewall auditing reports. The one or more security and compliance report generation dashboards may comprise a compliance auditing dashboard (e.g., 801) comprising a pane (e.g., 803) listing one or more compliance auditing reports for the subset of the plurality of cloud assets operating in the clouds of the two or more cloud service providers on which the one or more workloads of the given entity run, and one or more interface features for at least one of viewing and downloading respective ones of the one or more compliance auditing reports.

Figure 16:
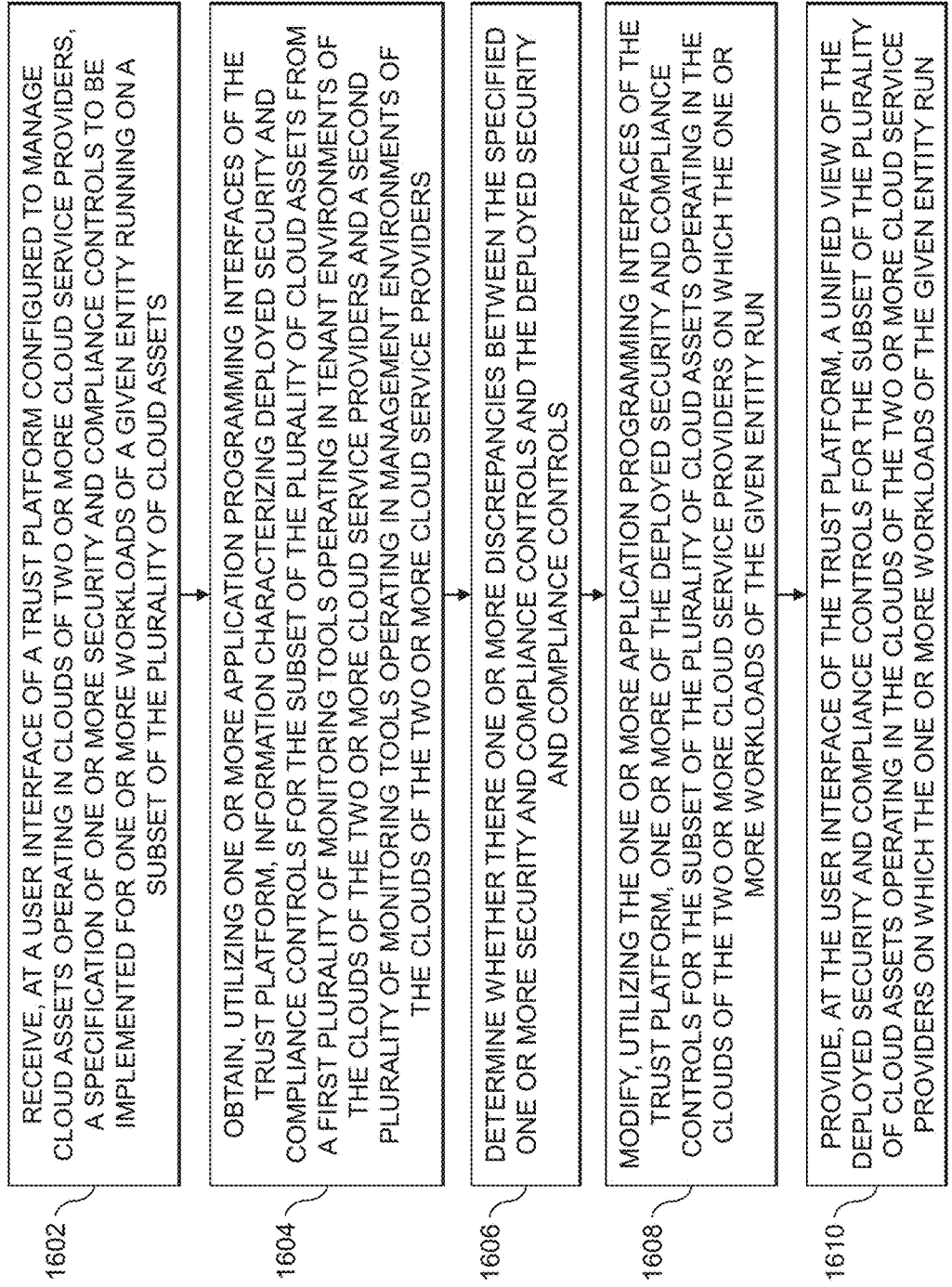
FIG. 16 is a flow diagram of an exemplary process for management of security and compliance controls for multi-cloud workloads in an illustrative embodiment.

An exemplary process 1600 for management of security and compliance controls for multi-cloud workloads will now be described in more detail with reference to the flow diagram of FIG. 16. It is to be understood that this particular process is only an example, and that additional or alternative processes for management of security and compliance controls for multi-cloud workloads may be used in other embodiments.

In this embodiment, the process 1600 includes steps 1602 through 1610. These steps are assumed to be performed by the trust platform 102 utilizing the trust platform GUI 112, the trust platform APIs 114 and the security and compliance control management module 118. The process begins with step 1602, receiving, at the trust platform GUI 112 of the trust platform 102 configured to manage a plurality of cloud assets operating in clouds of the CSPs 110, a specification of one or more security and compliance controls to be implemented for one or more workloads of a given entity running on a subset of the plurality of cloud assets operating in the clouds of the CSPs 110.

In step 1604, the one or more trust platform APIs 114 are utilized to obtain information characterizing deployed security and compliance controls for the subset of the plurality of cloud assets operating in the clouds of the CSPs 110 on which the one or more workloads of the given entity run from a first plurality of monitoring tools operating in tenant environments (e.g., customer zones 207) of the clouds of the CSPs 110 and a second plurality of monitoring tools operating in management environments (e.g., internal zones 211) of the clouds of the CSPs 110.

In step 1606, a determination is made as to whether there are one or more discrepancies between the specified one or more security and compliance controls and the deployed security and compliance controls. In step 1608, the one or more trust platform APIs 114 are utilized to modify one or more of the deployed security and compliance controls for the subset of the plurality of cloud assets operating in the clouds of the CSPs 110 on which the one or more workloads of the given entity run responsive to determining that there are one or more discrepancies between the specified one or more security and compliance controls and the deployed security and compliance controls in step 1606.

The first plurality of monitoring tools may be deployed by the given entity in the tenant environments of the clouds of the CSPs 110, and step 1608 may include utilizing the trust platform APIs 114 to modify a configuration of at least one monitoring tool in the first plurality of monitoring tools to adjust at least one of the deployed security and compliance controls to at least one of the specified security and compliance controls. The second plurality of monitoring tools may be deployed by the operators of the CSPs 110 in the management environments of the clouds of the CSPs 110 for monitoring the plurality of cloud assets utilized by the given entity and one or more additional entities, and step 1608 may include utilizing the trust platform APIs 114 to modify a configuration of at least one monitoring tool in the second plurality of monitoring tools to adjust at least one of the deployed security and compliance controls to at least one of the specified security and compliance controls. In some embodiments, step 1608 includes utilizing the one or more trust platform APIs 114 to modify a configuration of at least one of the subset of the plurality of cloud assets to adjust at least one of the deployed security and compliance controls to at least one of the specified security and compliance controls.

The process 1600 continues in step 1610 with providing, at the trust platform GUI 112 of the trust platform 102, a unified view of the deployed security and compliance controls for the subset of the plurality of cloud assets operating in the clouds of the CSPs 110 on which the one or more workloads of the given entity run. Step 1610 may include providing user interface features indicating whether individual ones of a set of security and compliance controls are deployed for respective ones of the cloud assets in the subset. Step 1610 may also or alternatively include providing user interface features for modifying the deployed security and compliance controls for respective ones of the cloud assets in the subset.

In some embodiments, the unified view of security and compliance for the one or more workloads of the given entity comprises an asset management dashboard (e.g., 901), the asset management dashboard comprising a pane (e.g., 903) comprising a table of the subset of the plurality of cloud assets operating in the clouds of the CSPs 110 on which the one or more workloads of the given entity run, the pane comprising a set of user interface features for filtering the table of the cloud assets by one or more cloud asset attributes. The one or more cloud asset attributes may comprise information indicating whether respective ones of the cloud assets have different security and compliance controls deployed. The one or more cloud asset attributes may comprise, for a given one of the subset of the plurality of cloud assets, a first cloud asset attribute indicating whether the given cloud asset is powered on and a second cloud asset attribute indicating a given one of the CSPs 110 on which the given cloud asset operates. The one or more cloud asset attributes may comprise, for a given one of the subset of the plurality of cloud assets, indications of whether the given cloud asset has one or more security features enabled. The one or more security features may comprise at least one of host security and data-at-rest encryption.

Figure 17:
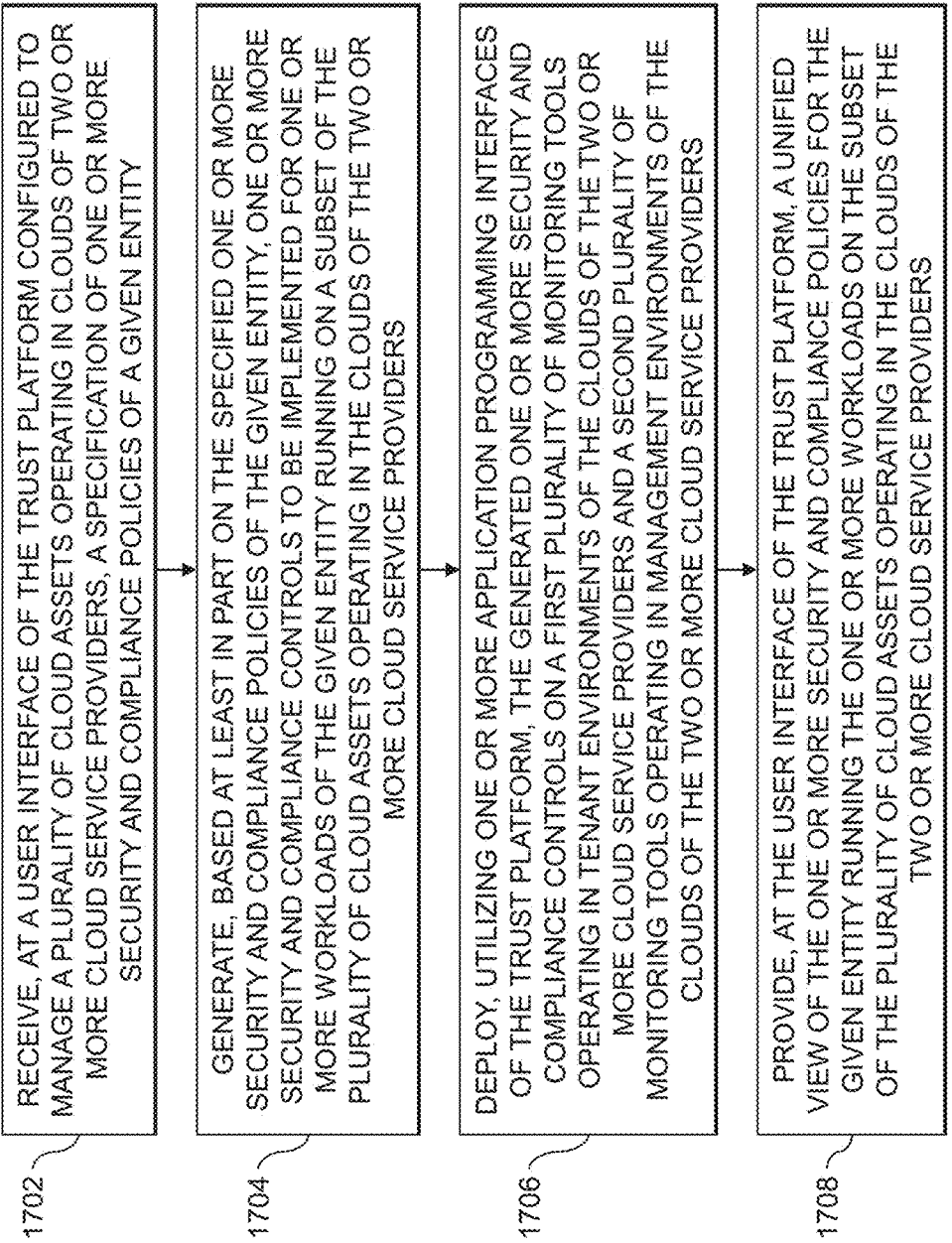
FIG. 17 is a flow diagram of an exemplary process for policy-driven management of security and compliance controls for multi-cloud workloads in an illustrative embodiment.

An exemplary process 1700 for policy-driven management of security and compliance controls for multi-cloud workloads will now be described in more detail with reference to the flow diagram of FIG. 17. It is to be understood that this particular process is only an example, and that additional or alternative processes for policy-driven management of security and compliance controls for multi-cloud workloads may be used in other embodiments.

In this embodiment, the process 1700 includes steps 1702 through 1708. These steps are assumed to be performed by the trust platform 102 utilizing the trust platform GUI 112, the trust platform APIs 114 and the policy-driven control generation module 120. The process begins with step 1702, receiving at the trust platform GUI 112 of the trust platform 102, a specification of one or more security and compliance policies of a given entity. In step 1704, one or more security and compliance controls to be implemented for one or more workloads of the given entity running on a subset of the plurality of cloud assets operating in the clouds of the CSPs 110 are generated based at least in part on the one or more security and compliance policies of the given entity specified in step 1702. In step 1706, the trust platform APIs 114 of the trust platform 102 are utilized to deploy the one or more security and compliance controls generated in step 1704 on a first plurality of monitoring tools operating in tenant environments (e.g., 207) of the clouds of the CSPs 110 and a second plurality of monitoring tools operating in management environments (e.g., 211) of the clouds of the CSPs 110.

In some embodiments, the one or more security and compliance policies for the given entity comprise one or more perimeter security and compliance policies, with step 1704 including generating one or more perimeter security and compliance controls that are deployed in step 1706 on ones of the monitoring tools in the first plurality of monitoring tools and the second plurality of monitoring tools that provide at least one of firewall, network intrusion detection, network intrusion protection and penetration testing for the subset of the plurality of cloud assets operating in the clouds of the CSPs 110 on which the one or more workloads of the given entity run. The one or more security and compliance policies for the given entity may also or alternatively comprise one or more network security and compliance policies, with step 1704 including generating one or more network security and compliance controls that are deployed in step 1706 on ones of the monitoring tools in the first plurality of monitoring tools and the second plurality of monitoring tools that provide at least one of network intrusion detection, network intrusion prevention, vulnerability scanning, network segregation and network segmentation for the subset of the plurality of cloud assets operating in the clouds of the CSPs 110 on which the one or more workloads of the given entity run. The one or more security and compliance policies for the given entity may further or alternatively comprise one or more host security and compliance policies, with step 1704 including generating one or more host security and compliance controls that are deployed in 1706 on ones of the monitoring tools in the first plurality of monitoring tools and the second plurality of monitoring tools that provide at least one of host firewall, host instruction detection, host intrusion prevention, anti-virus, anti-malware, file integrity monitoring, operating system patch management and vulnerability scanning for the subset of the plurality of cloud assets operating in the clouds of the CSPs 110 on which the one or more workloads of the given entity run.

The one or more security and compliance policies for the given entity may further or alternatively comprise one or more application and data security and compliance policies, with step 1704 including generating one or more application and data security and compliance controls that are deployed in step 1706 on ones of the monitoring tools in the first plurality of monitoring tools and the second plurality of monitoring tools that provide at least one of data encryption, vulnerability scanning, patch management, virus scanning and malware scanning for the subset of the plurality of cloud assets operating in the clouds of the CSPs 110 on which the one or more workloads of the given entity run. The one or more security and compliance policies for the given entity may further or alternatively comprise one or more monitoring and reporting security and compliance policies, with step 1704 including generating one or more monitoring and reporting security and compliance controls that are deployed in step 1706 on ones of the monitoring tools in the first plurality of monitoring tools and the second plurality of monitoring tools that provide at least one of security information and event management, security intelligence and operations, log management, alerting, and incident handling for the subset of the plurality of cloud assets operating in the clouds of the CSPs 110 on which the one or more workloads of the given entity run.

The process 1700 continues with step 1708, providing, at the trust platform GUI 112 of the trust platform 102, a unified view of the one or more security and compliance policies for the given entity running the one or more workloads on the subset of the plurality of cloud assets operating in the clouds of the CSPs 110. Step 1708 may include providing user interface features indicating whether individual ones of a set of security and compliance policies are to be utilized for the subset of the plurality of cloud assets operating in the clouds of the two or more cloud service providers on which the one or more workloads of the given entity run. Step 1708 may also or alternatively comprise providing user interface features for modifying one or more previously-specified security and compliance policies for the given entity.

In some embodiments, the unified view of security and compliance for the one or more workloads of the given entity comprises a policy management dashboard (e.g., 701), the policy management dashboard comprising a pane (e.g., 703) with a set of user interface features for inputting the specification of the one or more security and compliance policies for the given entity. The one or more security and compliance policies for the given entity may comprise one or more vulnerability management policies, and the set of user interface features may comprise user interface features for specifying remediation timelines for two or more different categories of vulnerabilities. The one or more security and compliance policies for the given entity may also or alternatively comprise one or more log management policies, such as a log forwarding policy where the set of user interface features comprises user interface features for specifying a destination address information for a destination to which logs generated by the subset of the plurality of cloud assets operating in the clouds of the CSPs 110 on which the one or more workloads of the given entity run are to be forwarded to.

Figure 18:
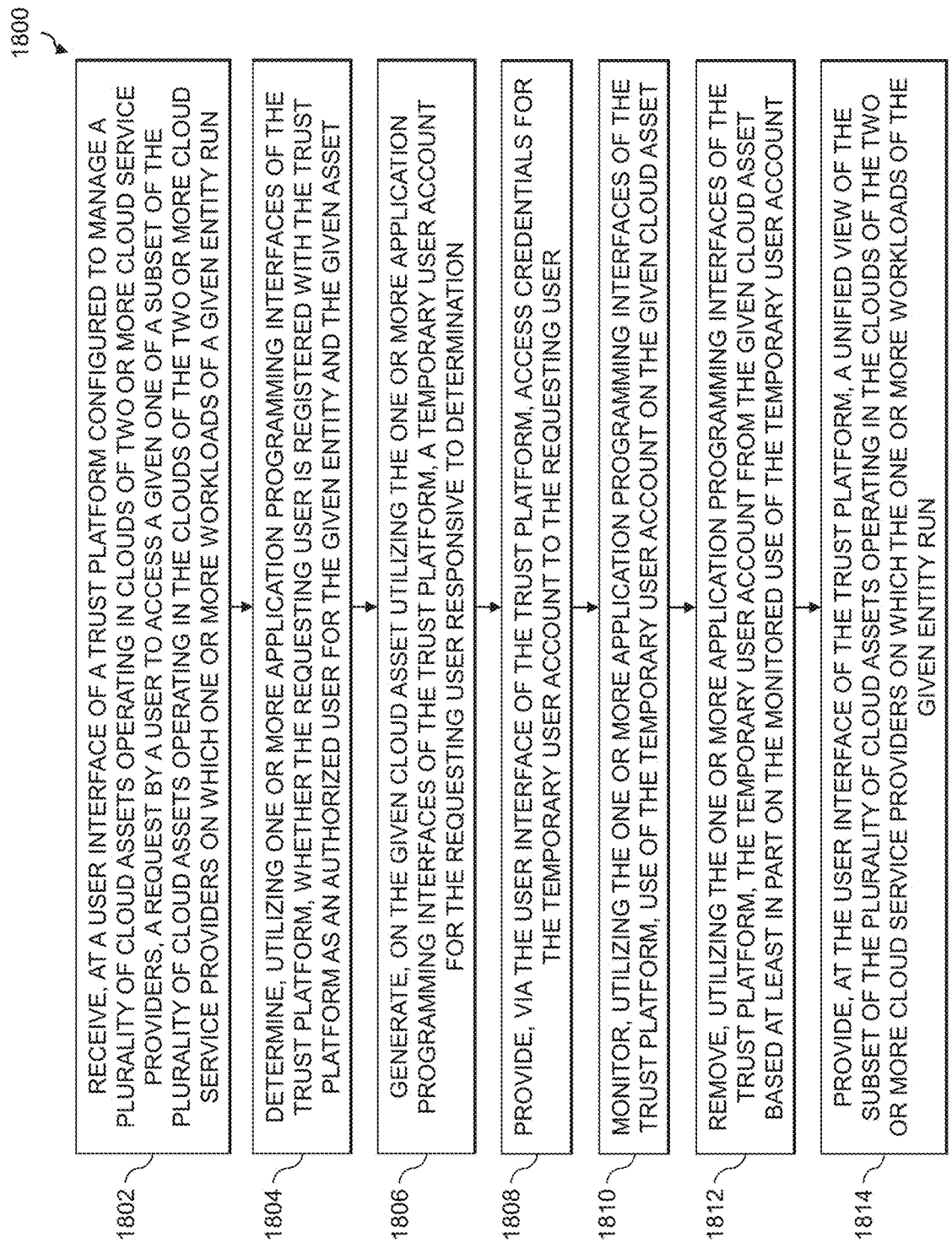
FIG. 18 is a flow diagram of an exemplary process for access management for multi-cloud workloads in an illustrative embodiment.

An exemplary process 1800 for access management for multi-cloud workloads will now be described in more detail with reference to the flow diagram of FIG. 18. It is to be understood that this particular process is only an example, and that additional or alternative processes for access management for multi-cloud workloads may be used in other embodiments.

In this embodiment, the process 1800 includes steps 1802 through 1814. These steps are assumed to be performed by the trust platform 102 utilizing the trust platform GUI 112, the trust platform APIs 114 and the ephemeral just-in-time access management module 122. The process begins with step 1802, receiving at the trust platform GUI 112 of the trust platform 102 a request by a user to access a given one of a subset of the plurality of cloud assets operating in the clouds of the CSPs 110 on which one or more workloads of a given entity run. In step 1804, the trust platform APIs 114 of the trust platform 102 are utilized to determine whether the requesting user is registered with the trust platform 102 as an authorized user for the given entity and the given asset.

A temporary user account for the requesting user is generated on the given cloud asset in step 1806 utilizing the trust platform APIs 114 of the trust platform 102 responsive to determining that the requesting user is registered with the trust platform 102 as an authorized user for the given entity and the given asset in step 1804. Step 1806 may utilize a limited process account previously created on the given asset that is associated with the trust platform 102. The given cloud asset may comprise a VM, and the temporary user account may comprise an account for an OS of the VM, for one or more applications running in the OS of the VM, etc. The given cloud asset may alternatively comprise a software container, and the temporary user account may comprise an account for one or more applications running in the software container. The given cloud asset may alternatively comprise a monitoring tool that is deployed in a tenant environment (e.g., 207) or a management environment (e.g., 211) of one of the CSPs 110.

In step 1808, access credentials for the temporary user account are provided to the requesting user via the trust platform GUI 112 of the trust platform 102. Use of the temporary user account on the given cloud asset is monitored in step 1810 utilizing the trust platform APIs 114 of the trust platform 102. In step 1812, the trust platform APIs 114 of the trust platform 102 are used to remove the temporary user account from the given cloud asset based at least in part on the monitored use of the temporary user account on the given cloud asset.

Step 1810 may include detecting one or more login events on the given cloud asset that utilize the temporary user account, and step 1812 may include deleting the temporary user account responsive to detecting a threshold number of login events on the given cloud asset that utilize the temporary user account. The threshold number of login events may comprise a single login event (e.g., such that the temporary user account is single-use and is removed after its first use). In some embodiments, step 1812 also or alternatively includes deleting the temporary user account a threshold period of time following generation of the temporary user account. In some embodiments, step 1810 includes detecting one or more login events on the given cloud asset that utilize the temporary user account, and step 1812 includes deleting the temporary user account a threshold period of time following detection of a threshold number of login events on the given cloud asset that utilize the temporary user account.

The process 1800 continues with step 1814, providing, at the trust platform GUI 112 of the trust platform 102, a unified view of the subset of the plurality of cloud assets operating in the clouds of the CSPs 110 on which the one or more workloads of the given entity run. The unified view of the subset of the plurality of cloud assets operating in the clouds of the CSPs 110 on which the one or more workloads of the given entity run may comprise user interface features for at least one of generating and removing temporary user accounts on respective ones of the subset of the plurality of cloud assets operating in the clouds of the CSPs 110 on which the one or more workloads of the given entity run. The unified view of the subset of the plurality of cloud assets operating in the clouds of the CSPs 110 on which the one or more workloads of the given entity run may comprise an asset management dashboard (e.g., 901), with the asset management dashboard comprising a pane (e.g., 903) with a table of the subset of the plurality of cloud assets operating in the clouds of the CSPs 110 on which the one or more workloads of the given entity run, the pane comprising a set of user interface features for filtering the table of the cloud assets by one or more cloud asset attributes. In some embodiments, step 1810 includes generating logs responsive to login and logout events on the given cloud asset that utilize the temporary user account, and the unified view of the subset of the plurality of cloud assets operating in the clouds of the CSPs 110 on which the one or more workloads of the given entity run comprises an audit report of login and logout events on the given asset that is created based at least in part on the generated logs.

Figure 19:
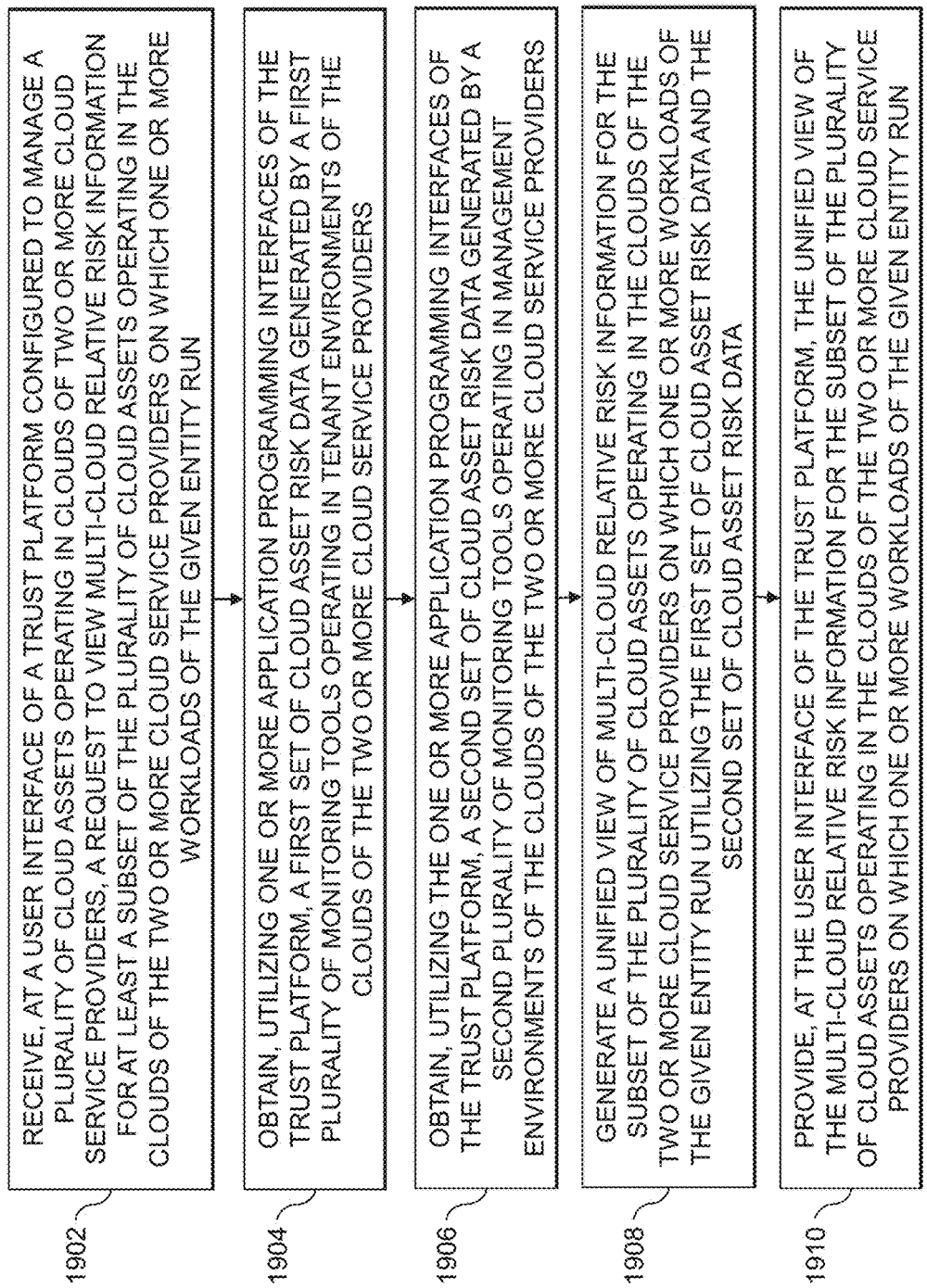
FIG. 19 is a flow diagram of an exemplary process for relative risk ranking of cloud assets used in multi-cloud workloads in an illustrative embodiment.

An exemplary process 1900 for relative risk ranking of cloud assets used in multi-cloud workloads will now be described in more detail with reference to the flow diagram of FIG. 19. It is to be understood that this particular process is only an example, and that additional or alternative processes for relative risk ranking of cloud assets used in multi-cloud workloads may be used in other embodiments.

In this embodiment, the process 1900 includes steps 1902 through 1910. These steps are assumed to be performed by the trust platform 102 utilizing the trust platform GUI 112, the trust platform APIs 114 and the multi-cloud asset risk ranking module 124. The process begins with step 1902, receiving, at the trust platform GUI 112 of the trust platform 102 configured to manage a plurality of cloud assets operating in clouds of the CSPs 110, a request to view multi-cloud relative risk information for at least a subset of the plurality of cloud assets operating in the clouds of the CSPs 110 on which one or more workloads of a given entity run. The multi-cloud relative risk information may comprise a ranking of the cloud assets (e.g., based on multi-cloud relative risk values associated with the cloud assets). The multi-cloud relative risk information or ranking for a given cloud asset (e.g., running on a first cloud of a first one of the CSPs 110) may be based at least in part on one or more of: exposure of the given cloud asset to one or more other cloud assets (e.g., which also run on the first cloud of the first CSP 110, which run on at least a second cloud of at least a second one of the CSPs 110, etc.); a determined importance, to the given entity, of at least a given one of the one or more workloads running on the given cloud asset; a determined risk of the first CSP 110 relative to one or more other ones of the CSPs 110; whether respective ones of a plurality of security controls are deployed for the given cloud asset; etc. The plurality of security controls may comprise at least two of: one or more perimeter security controls for a given cloud of a given one of the two or more cloud service providers on which the given cloud asset runs; one or more network security controls for a given network segment of the given cloud on which the given cloud asset runs; one or more host security controls for the given cloud asset; and one or more application and data security controls for a given one of the one or more workloads of the given entity running on the given cloud asset.

In step 1904, the trust platform APIs 114 of the trust platform 102 are utilized to obtain a first set of cloud asset risk data generated by a first plurality of monitoring tools operating in tenant environments (e.g., 207) of the clouds of the CSPs 110. In step 1906, the trust platform APIs 114 of the trust platform 102 are utilized to obtain a second set of cloud asset risk data generated by a second plurality of monitoring tools operating in management environments (e.g., 211) of the clouds of the CSPs 110. In some embodiments, the first plurality of monitoring tools are deployed by the given entity in the tenant environments of the clouds of the CSPs 110 and the second plurality of monitoring tools are deployed by the operators of the CSPs 110 in the management environments of the clouds of the CSPs 110 for monitoring the plurality of cloud assets utilized by the given entity and one or more additional entities. The first plurality of monitoring tools may provide cloud asset risk data for storage in a per-entity log analytics data store (e.g., 208-4), the per-entity log analytics data store comprising distinct workspaces associated with the given entity and one or more additional entities running one or more additional workloads on one or more additional subsets of the plurality of cloud assets operating in the clouds of the CSPs 110. The second plurality of monitoring tools may provide cloud asset risk data for storage in a shared log analytics data store (e.g., 208-5), the shared log analytics data store comprising a combined workspace for cloud asset risk data generated across the clouds of the CSPs 110.

In step 1908, a unified view of the multi-cloud relative risk information for the subset of the plurality of cloud assets operating in the clouds of the CSPs 110 on which one or more workloads of the given entity run is generated utilizing the first set of cloud asset risk data and the second set of cloud asset risk data obtained in steps 1904 and 1906. The unified view of the multi-cloud relative risk information for the subset of the plurality of cloud assets operating in the clouds of the CSPs 110 on which one or more workloads of the given entity run is provided in step 1910 utilizing the trust platform GUI 112 of the trust platform 102.

The unified view of the multi-cloud relative risk information may comprise an alert dashboard (e.g., 401), the alert dashboard comprising: a first pane (e.g., 403) comprising a plot of alerts generated by the first plurality of monitoring tools and the second plurality of monitoring tools for the subset of the plurality of cloud assets operating in the clouds of the CSPs 110 on which the one or more workloads of the given entity run; and a second pane (e.g., 407) comprising a table of the alerts generated by the first plurality of monitoring tools and the second plurality of monitoring tools for the subset of the plurality of cloud assets operating in the clouds of the CSPs 110 on which the one or more workloads of the given entity run. At least one of the first pane and the second pane comprises a set of user interface features for filtering based at least in part on one or more cloud asset risk values associated with the cloud assets, and at least one of the plot of the alerts in the first pane and the table of the alerts in the second pane is dynamically updated in response to filtering based at least in part on the one or more cloud asset risk values associated with the cloud assets utilizing the set of user interface features.

The unified view of the multi-cloud relative risk information may also or alternatively comprise a vulnerability dashboard (e.g., 501), the vulnerability dashboard comprising: a first pane (e.g., 503) comprising a vulnerability aging report for vulnerabilities reported by the first plurality of monitoring tools and the second plurality of monitoring tools for the subset of the plurality of cloud assets operating in the clouds of the CSPs 110 on which the one or more workloads of the given entity run; and a second pane (e.g., 507) comprising a table of the vulnerabilities reported by the first plurality of monitoring tools and the second plurality of monitoring tools for the subset of the plurality of cloud assets operating in the clouds of the CSPs 110 on which the one or more workloads of the given entity run. At least one of the first pane and the second pane comprises a set of user interface features for filtering based at least in part on one or more cloud asset risk values associated with the cloud assets, and at least one of the vulnerability aging report in the first pane and the table of the vulnerabilities in the second pane is dynamically updated in response to filtering based at least in part on the one or more cloud asset risk values associated with the cloud assets utilizing the set of user interface features.

The unified view of the multi-cloud relative risk information may further or alternatively comprise an asset management dashboard (e.g., 901), the asset management dashboard comprising a pane (e.g., 903) comprising a table of the subset of the plurality of cloud assets operating in the clouds of the CSPs 110 on which the one or more workloads of the given entity run, the pane comprising a set of user interface features for filtering the table of the cloud assets based at least in part on cloud asset risk values of the cloud assets. The table of the cloud assets may comprise information characterizing two or more risk factors associated with the cloud assets. A given cloud asset risk value for a given one of the subset of the plurality of cloud assets may be based at least in part on a weighted combination of values for the two or more risk factors associated with the given cloud asset.

Figure 20:
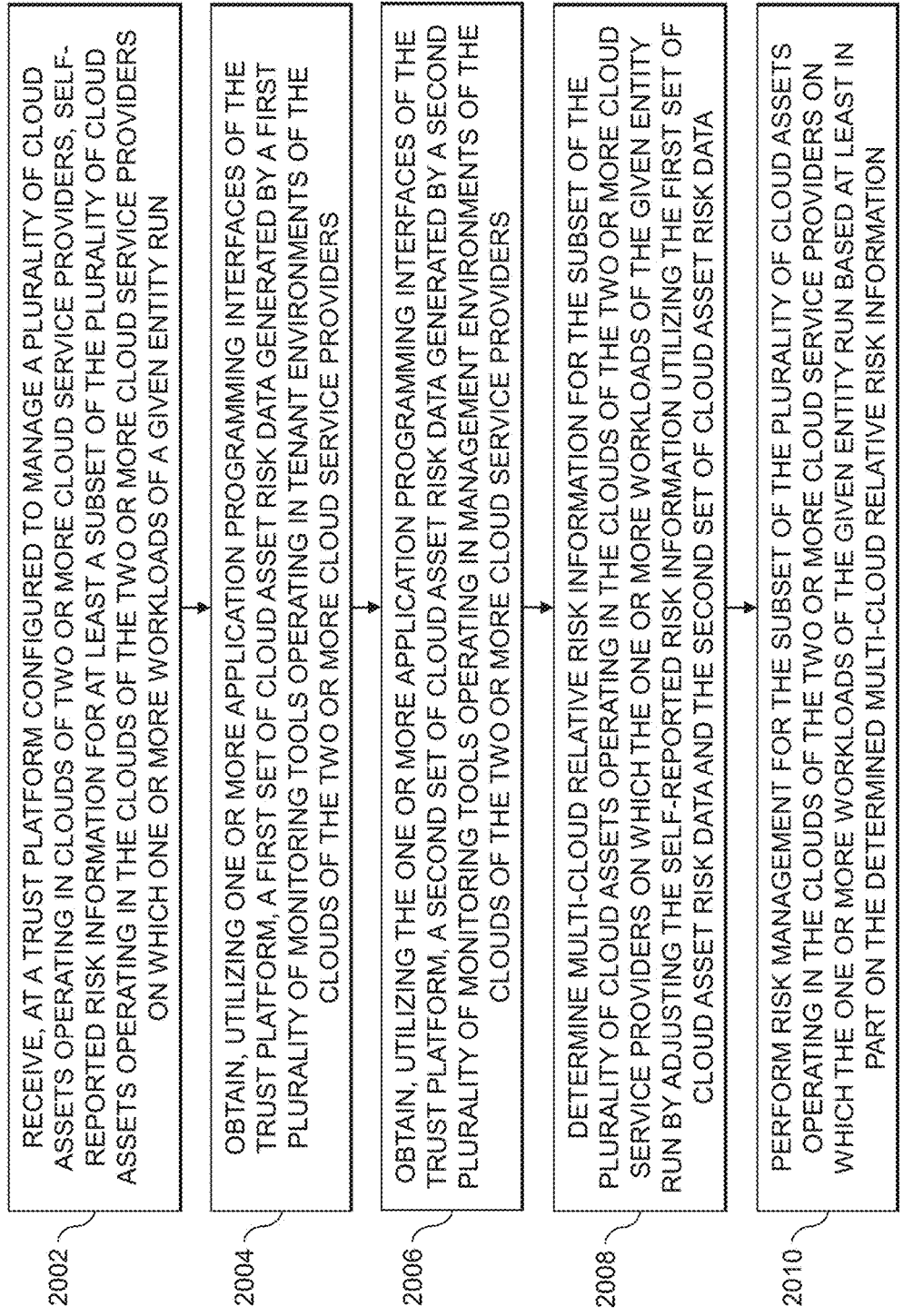
FIG. 20 is a flow diagram of an exemplary process for management of multi-cloud workloads using relative risk ranking of cloud assets in an illustrative embodiment.

An exemplary process 2000 for management of multi-cloud workloads using relative risk ranking of cloud assets will now be described in more detail with reference to the flow diagram of FIG. 20. It is to be understood that this particular process is only an example, and that additional or alternative processes for management of multi-cloud workloads using relative risk ranking of cloud assets may be used in other embodiments.

In this embodiment, the process 2000 includes steps 2002 through 2010. These steps are assumed to be performed by the trust platform 102 utilizing the trust platform GUI 112, the trust platform APIs 114 and the multi-cloud risk management module 126. The process begins with step 2002, receiving, at the trust platform 102 configured to manage a plurality of cloud assets operating in clouds of the CSPs 110, self-reported risk information for at least a subset of the plurality of cloud assets operating in the clouds of the CSPs 110 on which one or more workloads of a given entity run. The self-reported risk information for a given cloud asset in the subset of the plurality of cloud assets may comprise a given self-reported risk of at least one of one or more vulnerabilities and one or more alerts associated with the given cloud asset. The given cloud asset may comprise at least one of a software container and a VM, and the given self-reported risk may be specified by software operating on said at least one of the software container and the virtual machine that generates said at least one of the one or more vulnerabilities and the one or more alerts. The given self-reported risk may be specified by a vendor of the software operating on said at least one of the software container and the virtual machine that generates said at least one of the one or more vulnerabilities and the one or more alerts.

In step 2004, the trust platform APIs 114 of the trust platform 102 are utilized to obtain a first set of cloud asset risk data generated by a first plurality of monitoring tools operating in tenant environments (e.g., 207) of the clouds of the CSPs 110. In step 2006, the trust platform APIs 114 of the trust platform 102 are utilized to obtain a second set of cloud asset risk data generated by a second plurality of monitoring tools operating in management environments (e.g., 211) of the clouds of the CSPs 110. The first plurality of monitoring tools may be deployed by the given entity in the tenant environments of the clouds of the CSPs 110, and the second plurality of monitoring tools are deployed by the operators of the CSPs 110 in the management environments of the clouds of the CSPs 110 for monitoring the plurality of cloud assets utilized by the given entity and one or more additional entities. The first plurality of monitoring tools may provide cloud asset risk data for storage in a per-entity log analytics data store, the per-entity log analytics data store comprising distinct workspaces associated with the given entity and one or more additional entities running one or more additional workloads on one or more additional subsets of the plurality of cloud assets operating in the clouds of the CSPs 110. The second plurality of monitoring tools may provide cloud asset risk data for storage in a shared log analytics data store, the shared log analytics data store comprising a combined workspace for cloud asset risk data generated across the clouds of the CSPs 110.

Multi-cloud relative risk information for the subset of the plurality of cloud assets operating in the clouds of the CSPs 110 on which the one or more workloads of the given entity run is determined in step 2008 by adjusting the self-reported risk information utilizing the first set of cloud asset risk data and the second set of cloud asset risk data. Adjusting the self-reported risk information for a given cloud asset in the subset of the plurality of cloud assets running on a given cloud of a given one of the CSPs 110 may be based at least in part on one or more of: determining an exposure of the given cloud asset to one or more other cloud assets in the subset of the plurality of cloud assets; a determined importance, to the given entity, of at least a given one of the one or more workloads running on the given cloud asset; a determined risk of the given CSP 110 relative to one or more other ones of the CSPs 110; and whether respective ones of a plurality of security controls are deployed for the given cloud asset. The plurality of security controls may comprise at least two of: one or more perimeter security controls for the given cloud of the given CSP 110 on which the given cloud asset runs; one or more network security controls for a given network segment of the given cloud on which the given cloud asset runs; one or more host security controls for the given cloud asset; and one or more application and data security controls for a given one of the one or more workloads of the given entity running on the given cloud asset.

In step 2010, risk management for the subset of the plurality of cloud assets operating in the clouds of the CSPs 110 on which the one or more workloads of the given entity run is performed based at least in part on the determined multi-cloud relative risk information. Step 2010 may include providing, at the trust platform GUI 112 of the trust platform 102, one or more interface features for management of the subset of the plurality of cloud assets operating in the clouds of the CSPs 110 on which the one or more workloads of the given entity run based at least in part on the determined multi-cloud relative risk information. Step 2010 may also or alternatively comprise generating a unified view of the multi-cloud relative risk information for the subset of the plurality of cloud assets operating in the clouds of the CSPs 110 on which one or more workloads of the given entity run and providing, at the trust platform GUI 112 of the trust platform 102, the unified view of the multi-cloud relative risk information for the subset of the plurality of cloud assets operating in the clouds of the CSPs on which one or more workloads of the given entity run. The unified view of the multi-cloud relative risk information may comprise an asset management dashboard (e.g., 901), the asset management dashboard comprising a pane (e.g., 903) comprising a table of the subset of the plurality of cloud assets operating in the clouds of the CSPs 110 on which the one or more workloads of the given entity run, the pane comprising a set of user interface features for filtering the table of the cloud assets based at least in part on one or more cloud asset risk values of the cloud assets.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for management of cloud assets operating on clouds of multiple cloud service providers will now be described in greater detail with reference to FIGS. 21 and 22. Although described in the context of system 100, these platforms may also be used to implement at least portions of other information processing systems in other embodiments.

Figure 21:
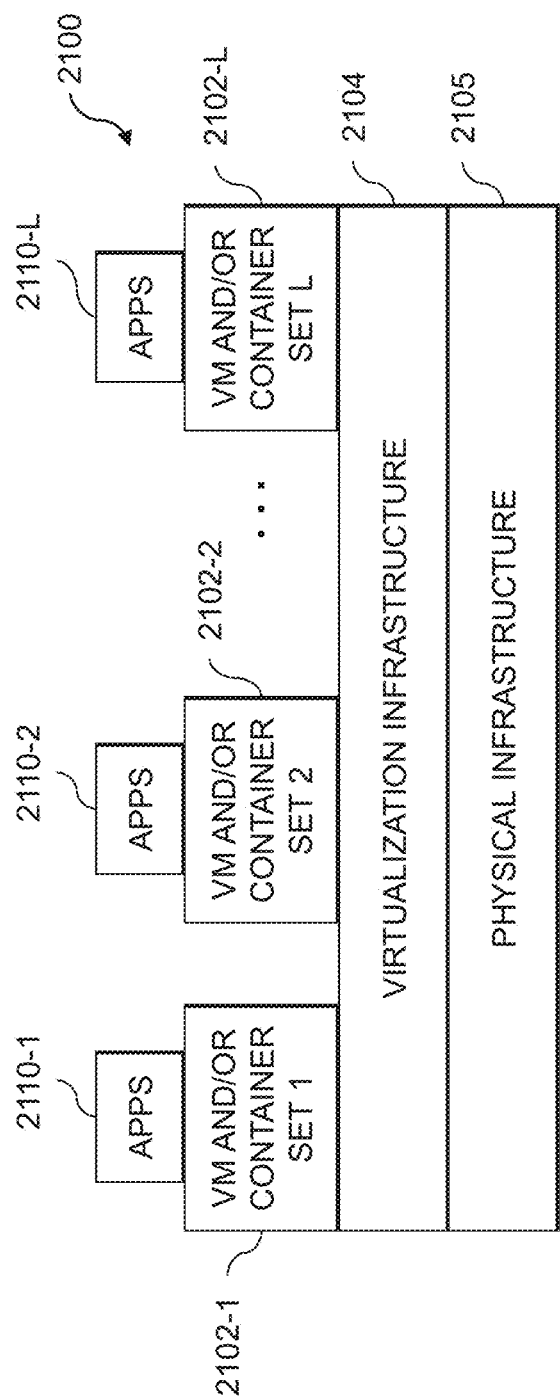
FIGS. 21 and 22 show examples of processing platforms that may be utilized to implement at least a portion of an information processing system in illustrative embodiments.
Figure 22:
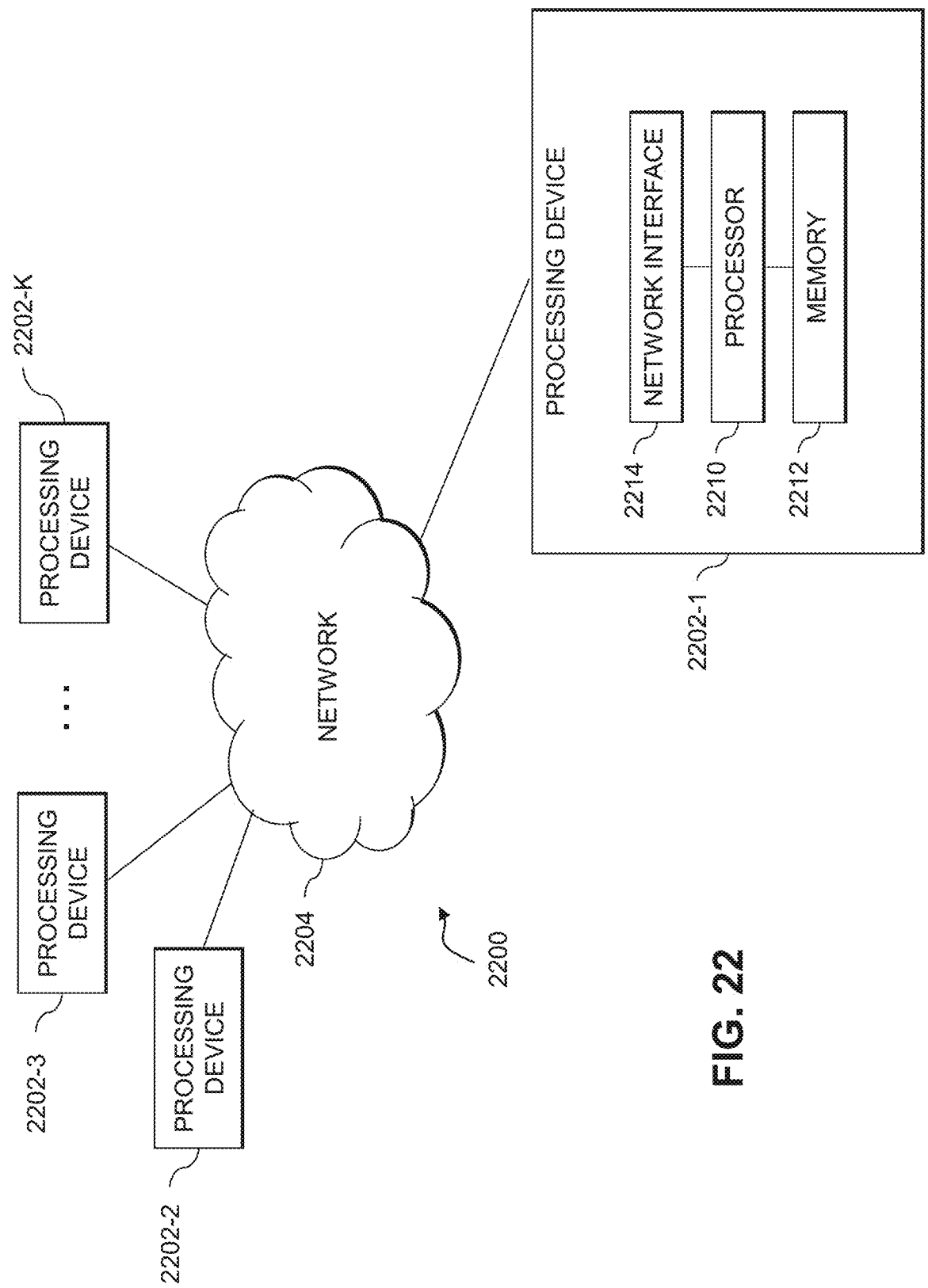

FIG. 21 shows an example processing platform comprising cloud infrastructure 2100. The cloud infrastructure 2100 comprises a combination of physical and virtual processing resources that may be utilized to implement at least a portion of the information processing system 100 in FIG. 1. The cloud infrastructure 2100 comprises multiple virtual machines (VMs) and/or container sets 2102-1, 2102-2, . . . 2102-L implemented using virtualization infrastructure 2104. The virtualization infrastructure 2104 runs on physical infrastructure 2105, and illustratively comprises one or more hypervisors and/or operating system level virtualization infrastructure. The operating system level virtualization infrastructure illustratively comprises kernel control groups of a Linux operating system or other type of operating system.

The cloud infrastructure 2100 further comprises sets of applications 2110-1, 2110-2, . . . 2110-L running on respective ones of the VMs/container sets 2102-1, 2102-2, . . . 2102-L under the control of the virtualization infrastructure 2104. The VMs/container sets 2102 may comprise respective VMs, respective sets of one or more containers, or respective sets of one or more containers running in VMs.

In some implementations of the FIG. 21 embodiment, the VMs/container sets 2102 comprise respective VMs implemented using virtualization infrastructure 2104 that comprises at least one hypervisor. A hypervisor platform may be used to implement a hypervisor within the virtualization infrastructure 2104, where the hypervisor platform has an associated virtual infrastructure management system. The underlying physical machines may comprise one or more distributed processing platforms that include one or more storage systems.

In other implementations of the FIG. 21 embodiment, the VMs/container sets 2102 comprise respective containers implemented using virtualization infrastructure 2104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2100 shown in FIG. 21 may represent at least a portion of one processing platform. Another example of such a processing platform is processing platform 2200 shown in FIG. 22.

The processing platform 2200 in this embodiment comprises a portion of system 100 and includes a plurality of processing devices, denoted 2202-1, 2202-2, 2202-3, . . . 2202-K, which communicate with one another over a network 2204.

The network 2204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2202-1 in the processing platform 2200 comprises a processor 2210 coupled to a memory 2212.

The processor 2210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2212 may comprise random access memory (RAM), read-only memory (ROM), flash memory or other types of memory, in any combination. The memory 2212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2202-1 is network interface circuitry 2214, which is used to interface the processing device with the network 2204 and other system components, and may comprise conventional transceivers.

The other processing devices 2202 of the processing platform 2200 are assumed to be configured in a manner similar to that shown for processing device 2202-1 in the figure.

Again, the particular processing platform 2200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for management of cloud assets operating on clouds of multiple cloud service providers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, cloud service providers, cloud monitoring tools, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving, at a user interface of a trust platform configured to manage a plurality of cloud assets operating in clouds of two or more cloud service providers, a request to view multi-cloud relative risk information for at least a subset of the plurality of cloud assets operating in the clouds of the two or more cloud service providers on which one or more workloads of a given entity run;
   obtaining, utilizing one or more application programming interfaces of the trust platform, a first set of cloud asset risk data generated by a first plurality of monitoring tools operating in tenant environments of the clouds of the two or more cloud service providers;
   obtaining, utilizing the one or more application programming interfaces of the trust platform, a second set of cloud asset risk data generated by a second plurality of monitoring tools operating in management environments of the clouds of the two or more cloud service providers;
   generating a unified view of the multi-cloud relative risk information for the subset of the plurality of cloud assets operating in the clouds of the two or more cloud service providers on which one or more workloads of the given entity run utilizing the first set of cloud asset risk data and the second set of cloud asset risk data; and
   providing, at the user interface of the trust platform, the unified view of the multi-cloud relative risk information for the subset of the plurality of cloud assets operating in the clouds of the two or more cloud service providers on which one or more workloads of the given entity run.

2. The apparatus of claim 1 wherein the first plurality of monitoring tools are deployed by the given entity in the tenant environments of the clouds of the two or more cloud service providers, and wherein the second plurality of monitoring tools are deployed by the operators of the two or more cloud service providers in the management environments of the clouds of the two or more cloud service providers for monitoring the plurality of cloud assets utilized by the given entity and one or more additional entities.

3. The apparatus of claim 2 wherein:
   the first plurality of monitoring tools provide cloud asset risk data for storage in a per-entity log analytics data store, the per-entity log analytics data store comprising distinct workspaces associated with the given entity and one or more additional entities running one or more additional workloads on one or more additional subsets of the plurality of cloud assets operating in the clouds of the two or more cloud service providers; and
   the second plurality of monitoring tools provide cloud asset risk data for storage in a shared log analytics data store, the shared log analytics data store comprising a combined workspace for cloud asset risk data generated across the clouds of the two or more cloud service providers.

4. The apparatus of claim 1 wherein the multi-cloud relative risk information for a given cloud asset in the subset of the plurality of cloud assets running on a first cloud of a first one of the two or more cloud service providers is based at least in part on exposure of the given cloud asset to one or more other cloud assets in the subset of the plurality of cloud assets running on at least a second cloud of at least a second one of the two or more cloud service providers.

5. The apparatus of claim 1 wherein the multi-cloud relative risk information for a given cloud asset in the subset of the plurality of cloud assets running on a given cloud of a given one of the two or more cloud service providers is based at least in part on exposure of the given cloud asset to one or more other cloud assets running on the given cloud of the given cloud service provider.

6. The apparatus of claim 1 wherein the multi-cloud relative risk information for a given cloud asset in the subset of the plurality of cloud assets is based at least in part on a determined importance, to the given entity, of at least a given one of the one or more workloads running on the given cloud asset.

7. The apparatus of claim 1 wherein the multi-cloud relative risk information for a given cloud asset in the subset of the plurality of cloud assets running on a given cloud of a given one of the two or more cloud service providers is based at least in part on a determined risk of the given cloud service provider relative to one or more other ones of the two or more cloud service providers.

8. The apparatus of claim 1 wherein the multi-cloud relative risk information for a given cloud asset in the subset of the plurality of cloud assets is based at least at least in part on whether respective ones of a plurality of security controls are deployed for the given cloud asset.

9. The apparatus of claim 8 wherein the plurality of security controls comprise at least two of:
   one or more perimeter security controls for the given cloud of the given one of the two or more cloud service providers on which the given cloud asset runs;
   one or more network security controls for a given network segment of the given cloud on which the given cloud asset runs;
   one or more host security controls for the given cloud asset; and
   one or more application and data security controls for a given one of the one or more workloads of the given entity running on the given cloud asset.

10. The apparatus of claim 1 wherein the unified view of the multi-cloud relative risk information comprises an alert dashboard, the alert dashboard comprising:
    a first pane comprising a plot of alerts generated by the first plurality of monitoring tools and the second plurality of monitoring tools for the subset of the plurality of cloud assets operating in the clouds of the two or more cloud service providers on which the one or more workloads of the given entity run; and
    a second pane comprising a table of the alerts generated by the first plurality of monitoring tools and the second plurality of monitoring tools for the subset of the plurality of cloud assets operating in the clouds of the two or more cloud service providers on which the one or more workloads of the given entity run;
    wherein at least one of the first pane and the second pane comprises a set of user interface features for filtering based at least in part on one or more cloud asset risk values associated with the cloud assets; and
    wherein at least one of the plot of the alerts in the first pane and the table of the alerts in the second pane is dynamically updated in response to filtering based at least in part on the one or more cloud asset risk values associated with the cloud assets utilizing the set of user interface features.

11. The apparatus of claim 1 wherein the unified view of the multi-cloud relative risk information comprises a vulnerability dashboard, the vulnerability dashboard comprising:
   a first pane comprising a vulnerability aging report for vulnerabilities reported by the first plurality of monitoring tools and the second plurality of monitoring tools for the subset of the plurality of cloud assets operating in the clouds of the two or more cloud service providers on which the one or more workloads of the given entity run; and
   a second pane comprising a table of the vulnerabilities reported by the first plurality of monitoring tools and the second plurality of monitoring tools for the subset of the plurality of cloud assets operating in the clouds of the two or more cloud service providers on which the one or more workloads of the given entity run;
   wherein at least one of the first pane and the second pane comprises a set of user interface features for filtering based at least in part on one or more cloud asset risk values associated with the cloud assets; and
   wherein at least one of the vulnerability aging report in the first pane and the table of the vulnerabilities in the second pane is dynamically updated in response to filtering based at least in part on the one or more cloud asset risk values associated with the cloud assets utilizing the set of user interface features.

12. The apparatus of claim 1 wherein the unified view of the multi-cloud relative risk information comprises an asset management dashboard, the asset management dashboard comprising a pane comprising a table of the subset of the plurality of cloud assets operating in the clouds of the two or more cloud service providers on which the one or more workloads of the given entity run, the pane comprising a set of user interface features for filtering the table of the cloud assets based at least in part on one or more cloud asset risk values of the cloud assets.

13. The apparatus of claim 12 wherein the table of the cloud assets comprises information characterizing two or more risk factors associated with the cloud assets.

14. The apparatus of claim 13 wherein a given cloud asset risk value for a given one of the subset of the plurality of cloud assets is based at least in part on a weighted combination of values for the two or more risk factors associated with the given cloud asset.

15. A computer program product comprising a non-transitory processor-readable storage medium having stored therein program code of one or more software programs, wherein the program code when executed by at least one processing device causes the at least one processing device to perform steps of:
   receiving, at a user interface of a trust platform configured to manage a plurality of cloud assets operating in clouds of two or more cloud service providers, a request to view multi-cloud relative risk information for at least a subset of the plurality of cloud assets operating in the clouds of the two or more cloud service providers on which one or more workloads of a given entity run;
   obtaining, utilizing one or more application programming interfaces of the trust platform, a first set of cloud asset risk data generated by a first plurality of monitoring tools operating in tenant environments of the clouds of the two or more cloud service providers;
   obtaining, utilizing the one or more application programming interfaces of the trust platform, a second set of cloud asset risk data generated by a second plurality of monitoring tools operating in management environments of the clouds of the two or more cloud service providers;
   generating a unified view of the multi-cloud relative risk information for the subset of the plurality of cloud assets operating in the clouds of the two or more cloud service providers on which one or more workloads of the given entity run utilizing the first set of cloud asset risk data and the second set of cloud asset risk data; and
   providing, at the user interface of the trust platform, the unified view of the multi-cloud relative risk information for the subset of the plurality of cloud assets operating in the clouds of the two or more cloud service providers on which one or more workloads of the given entity run.

16. The computer program product of claim 15 wherein the multi-cloud relative risk information for a given cloud asset in the subset of the plurality of cloud assets is based at least at least in part on whether respective ones of a plurality of security controls are deployed for the given cloud asset.

17. The computer program product of claim 16 wherein the plurality of security controls comprise at least two of:
   one or more perimeter security controls for a given cloud of a given one of the two or more cloud service providers on which the given cloud asset runs;
   one or more network security controls for a given network segment of the given cloud on which the given cloud asset runs;
   one or more host security controls for the given cloud asset; and
   one or more application and data security controls for a given one of the one or more workloads of the given entity running on the given cloud asset.

18. A method comprising:
   receiving, at a user interface of a trust platform configured to manage a plurality of cloud assets operating in clouds of two or more cloud service providers, a request to view multi-cloud relative risk information for at least a subset of the plurality of cloud assets operating in the clouds of the two or more cloud service providers on which one or more workloads of a given entity run;
   obtaining, utilizing one or more application programming interfaces of the trust platform, a first set of cloud asset risk data generated by a first plurality of monitoring tools operating in tenant environments of the clouds of the two or more cloud service providers;
   obtaining, utilizing the one or more application programming interfaces of the trust platform, a second set of cloud asset risk data generated by a second plurality of monitoring tools operating in management environments of the clouds of the two or more cloud service providers;
   generating a unified view of the multi-cloud relative risk information for the subset of the plurality of cloud assets operating in the clouds of the two or more cloud service providers on which one or more workloads of the given entity run utilizing the first set of cloud asset risk data and the second set of cloud asset risk data; and
   providing, at the user interface of the trust platform, the unified view of the multi-cloud relative risk information for the subset of the plurality of cloud assets operating in the clouds of the two or more cloud service providers on which one or more workloads of the given entity run;

wherein the method is performed by at least one processing device comprising a processor coupled to a memory.

19. The method of claim 18 wherein the multi-cloud relative risk information for a given cloud asset in the subset of the plurality of cloud assets is based at least at least in part on whether respective ones of a plurality of security controls are deployed for the given cloud asset.

20. The method of claim 19 wherein the plurality of security controls comprise at least two of:

one or more perimeter security controls for a given cloud of a given one of the two or more cloud service providers on which the given cloud asset runs;

one or more network security controls for a given network segment of the given cloud on which the given cloud asset runs;

one or more host security controls for the given cloud asset; and one or more application and data security controls for a given one of the one or more workloads of the given entity running on the given cloud asset.

* * * * *